United States Patent
Uchida et al.

(10) Patent No.: US 11,852,405 B2
(45) Date of Patent: Dec. 26, 2023

(54) REFRIGERATOR SYSTEM

(71) Applicant: Mitsubishi Electric Corporation, Tokyo (JP)

(72) Inventors: Tsuyoshi Uchida, Tokyo (JP); Satoshi Minezawa, Tokyo (JP); Eiji Niikura, Tokyo (JP); Yoko Inoue, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 806 days.

(21) Appl. No.: 16/964,225

(22) PCT Filed: May 31, 2018

(86) PCT No.: PCT/JP2018/021019
§ 371 (c)(1),
(2) Date: Jul. 23, 2020

(87) PCT Pub. No.: WO2019/229949
PCT Pub. Date: Dec. 5, 2019

(65) Prior Publication Data
US 2021/0041159 A1 Feb. 11, 2021

(51) Int. Cl.
*H04N 23/57* (2023.01)
*H04N 23/695* (2023.01)
(Continued)

(52) U.S. Cl.
CPC ............ *F25D 29/005* (2013.01); *F25D 11/02* (2013.01); *F25D 23/028* (2013.01);
(Continued)

(58) Field of Classification Search
CPC .. F25D 11/02; F25D 23/028; F25D 2323/021; F25D 2400/36; F25D 2400/361;
(Continued)

(56) References Cited

U.S. PATENT DOCUMENTS

| 5,199,778 A | 4/1993 | Aoki et al. |
| 11,283,872 B1 * | 3/2022 | Jayapalan ............ G06Q 20/405 |

(Continued)

FOREIGN PATENT DOCUMENTS

| CN | 103927755 A | 7/2014 |
| CN | 105164481 A | 12/2015 |

(Continued)

OTHER PUBLICATIONS ffice Action dated Jul. 21, 2022 in the corresponding Korean Patent Application No. 10-2020-7033450 (and English achine translation). x.

(Continued)

*Primary Examiner* — Omar S Ismail
(74) *Attorney, Agent, or Firm* — POSZ LAW GROUP, PLC

(57) ABSTRACT

A refrigerator system capable of reducing decrease in the accuracy of detecting change in a storage state and reducing a communication load for transmitting images of the inside of a storeroom, which are taken at a plurality of viewpoints to the outside of a refrigerator is provided. To achieve this, the refrigerator system includes: a camera configured to take the images of the inside of the storeroom; a camera moving device configured to move the camera at least in the vertical direction; a communication device configured to transmit the images taken by the camera to the outside of a main body; and a change detecting device configured to detect change in a food-item storage state of each shelf based on the images taken by the camera. The camera takes images of each shelf at a first viewpoint and a second viewpoint. The change detecting device detects change in the food-item storage state of the shelf based on the image taken at the first viewpoint. The communication device transmits, for the shelf, change in the food-item storage state of which is (Continued)

detected, both images taken at the first viewpoint and the second viewpoint to the outside of the main body.

16 Claims, 18 Drawing Sheets

(51) Int. Cl.
```
G06V 10/75      (2022.01)
G06V 10/20      (2022.01)
G06V 20/52      (2022.01)
G06V 20/68      (2022.01)
F25D 29/00      (2006.01)
F25D 11/02      (2006.01)
F25D 23/02      (2006.01)
H04N 1/00       (2006.01)
```
(52) U.S. Cl.
CPC ............ *G06V 10/255* (2022.01); *G06V 10/75* (2022.01); *G06V 20/52* (2022.01); *H04N 1/00129* (2013.01); *H04N 23/57* (2023.01); *H04N 23/695* (2023.01); *F25D 2323/021* (2013.01); *F25D 2400/36* (2013.01); *F25D 2500/06* (2013.01); *G06V 20/68* (2022.01); *H04N 1/00095* (2013.01)

(58) Field of Classification Search
CPC ...... F25D 25/02; F25D 25/04; F25D 2500/06; F25D 2700/06; F25D 29/005; G03B 17/561; G03B 29/00; G06F 18/22; G06V 10/255; G06V 10/75; G06V 20/52; G06V 20/68; H04N 1/00095; H04N 1/00129; H04N 23/50; H04N 23/57; H04N 23/695; H04N 7/183
See application file for complete search history.

(56) References Cited

U.S. PATENT DOCUMENTS

| | | | | |
|---|---|---|---|---|
| 2014/0214547 A1* | 7/2014 | Signorelli | .......... | G06Q 30/0267 705/14.64 |
| 2014/0252091 A1* | 9/2014 | Morse | .................... | G06F 16/70 312/404 |
| 2016/0088262 A1 | 3/2016 | Lee et al. | | |
| 2016/0138857 A1 | 5/2016 | Klingshirn | | |
| 2016/0203591 A1* | 7/2016 | Justaniah | .............. | G06T 7/0004 348/89 |
| 2017/0219276 A1* | 8/2017 | Wang | ...................... | H04N 23/90 |
| 2018/0059881 A1* | 3/2018 | Agboatwalla | ....... | G06F 3/04883 |
| 2019/0005565 A1* | 1/2019 | Hu | ...................... | G01C 21/3484 |
| 2019/0205821 A1* | 7/2019 | Werner | .............. | G06F 18/2413 |
| 2020/0088463 A1* | 3/2020 | Jeong | .................... | G06F 3/011 |
| 2020/0097776 A1* | 3/2020 | Kim | ........................ | G06T 7/70 |
| 2021/0131718 A1* | 5/2021 | Jeong | .................... | H04N 7/183 |

FOREIGN PATENT DOCUMENTS

| | | |
|---|---|---|
| CN | 107270627 A | 10/2017 |
| DE | 10 2013 211 097 A1 | 12/2014 |
| EP | 3 128 274 A1 | 2/2017 |
| JP | 2012-007769 A | 1/2012 |
| JP | 2014-196838 A | 10/2014 |
| JP | 2015222138 A | 12/2015 |
| JP | 2016-148503 A | 8/2016 |
| JP | 2016183826 A | 10/2016 |
| JP | 2017106671 A | 6/2017 |
| KR | 10-2017-0058581 A | 5/2017 |
| KR | 20170058581 A | 5/2017 |

OTHER PUBLICATIONS

Office Action dated Nov. 2, 2022 issued in corresponding KR Patent Application No. 10-2020-7033450 (and English machine translation).
Office Action dated Dec. 5, 2022 issued in corresponding EP Patent Application No. 18920415.9.
Office Action dated Jan. 20, 2022, issued in corresponding KR Patent Application No. 10-2020-7033450 (and English Machine Translation).
International Search Report of the International Searching Authority dated Aug. 14, 2018 for the corresponding International application No. PCT/JP2018/021019 (and English translation).
The Extended European Search Report dated May 25, 2021 in the corresponding EP application No. 18920415.9.
Office Action dated Aug. 19, 2021, issued in corresponding CN Patent Application No. 201880091256.4 (and English Machine Translation).

* cited by examiner

FRONT VIEW

LOOKING-DOWN

SLIGHTLY LOOKING-DOWN

SLIGHTLY LOOKING-UP

LOOKING-UP

2: CAMERA
7: ROUTER DEVICE
31: COMMUNICATION DEVICE
32: IMAGE PROCESSING DEVICE
33: CHANGE DETECTING DEVICE
34: STOCK MANAGING DEVICE

FIG. 21

| FOOD ITEM KIND | | SHAPE (OUTLINE) | SIZE (LONG AXIS) | COLOR (REPRESENTATIVE) | LABEL (CHARACTERS) |
|---|---|---|---|---|---|
| WATER (2L) |  | RECTANGLE (FOUR EDGES) | 300mm | R:234 G:234 B:234 | Water |
| MILK (CARTON) | 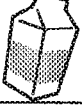 | RECTANGLE (FOUR EDGES) | 200mm | R:204 G:236 B:255 | Milk |
| JUICE (CARTON) |  | RECTANGLE (FOUR EDGES) | 100mm | R:255 G:153 B:102 | Orange Apple |
| CANNED BEER (350mL) | 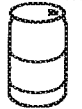 | RECTANGLE (FOUR EDGES) | 120mm | R:102 G:102 B:153 | Beer MANUFACTURER A MANUFACTURER B |
| CONTAINER |  | RECTANGLE (FOUR EDGES) | 140mm | R:0 G:153 B:204 | – |
| SALAD |  | ELLIPSE (FOUR EDGES) | 150mm | R:51 G:204 B:51 | – |
| TOMATO |  | ELLIPSE (NO EDGE) | 70mm | R:255 G:51 B:0 | – |
| CABBAGE |  | ELLIPSE (NO EDGE) | 180mm | R:153 G:255 B:102 | – |
| BANANA |  | RECTANGLE (FOUR EDGES) | 170mm | R:255 G:255 B:102 | – |

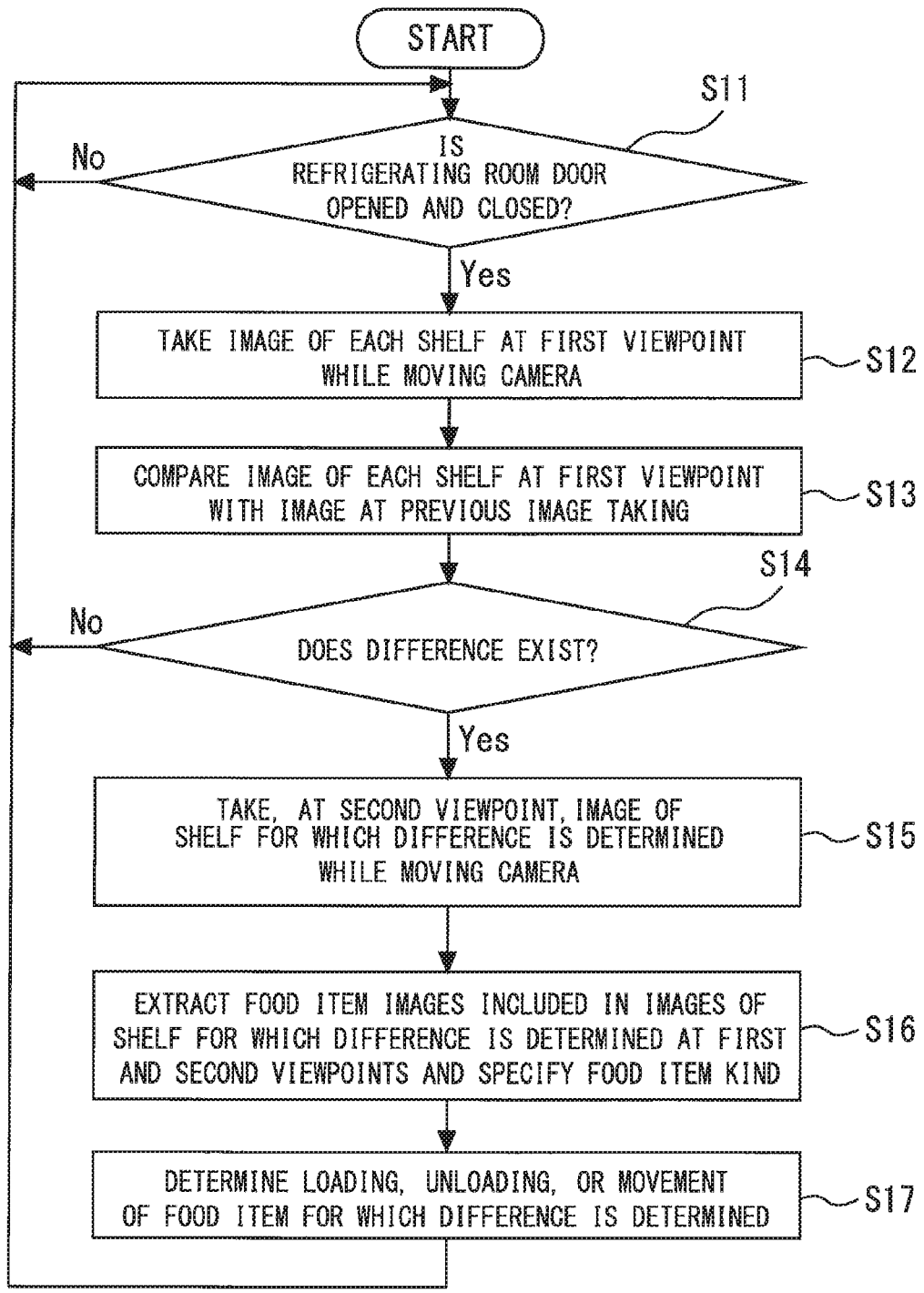

2: CAMERA
7: ROUTER DEVICE
31: COMMUNICATION DEVICE
32: IMAGE PROCESSING DEVICE
33: CHANGE DETECTING DEVICE
34: STOCK MANAGING DEVICE
91: FOOD ITEM INFORMATION RECORDING UNIT

REFRIGERATOR SYSTEM

FIELD

The present invention relates to a refrigerator system.

BACKGROUND

In a known refrigerator including a camera configured to sense an image of an inside of the refrigerator, image taking is performed while the camera is moved at a predetermined constant speed from an upper end of a movement range to a lower end thereof, then difference between images taken at different time points is detected, and the taken images are transmitted to a terminal device through a communication line (refer to PTL 1, for example).

CITATION LIST

Patent Literature

PTL 1: JP 2016-148503 A

SUMMARY

Technical Problem

However, in such a refrigerator as disclosed in PTL 1, since a plurality of images taken while the camera is moved at a constant speed are transmitted through a communication line, the amount of transmitted data is large and a communication load is large. In addition, depending on the timing of image taking by the camera being moved, a food item on a shelf plate in a storeroom is potentially largely distorted or a farther food item on a shelf plate is potentially hidden by a nearer food item or the shelf plate. Thus, there is a concern that the accuracy of detecting difference between different time points, in other words, change in a food-item storage state in the storeroom may decrease when obtained images are used.

The present invention is intended to solve such a problem. It is an objective of the present invention to provide a refrigerator system capable of reducing decrease of the accuracy of detecting change in a food-item storage state in a storeroom and reducing a communication load when images of the inside of the storeroom, which are taken at a plurality of viewpoints are transmitted to the outside of a refrigerator.

Solution to Problem

A refrigerator system according to the present invention includes: a main body having a storeroom for storing a food item; one or more shelfs provided in a storeroom, each shelf configured to be put a food item on; a door configured to open and close a side of the storeroom; a camera arranged on an inner surface of the door, the camera configured to take an image of an inside of the storeroom; a camera moving device configured to move the camera at least in a vertical direction; a communication device configured to send an image taken by the camera to outside of the main body; a terminal device configured to display the image sent to outside of the main body by the communication device, and a change detecting device configured to detect, based on the image taken by the camera, a change of food stored state for each shelf, the camera configured to take the image for each shelf from a first viewpoint and one or more second viewpoints, each second viewpoint being different from the first viewpoint, the change detecting device configured to detect, based on the image taken from the first viewpoint, the change of food stored state for each shelf, the communication device configured to send out images taken from both of the first viewpoint and the second viewpoint for the shelf in which the change detecting device detects the change of food stored state.

Advantageous Effects of Invention

A refrigerator system according to the present invention achieves effects of reducing decrease of the accuracy of detecting change in a food-item storage state in a storeroom and reducing a communication load when images of the inside of the storeroom, which are taken at a plurality of viewpoints are transmitted to the outside of a refrigerator.

BRIEF DESCRIPTION OF THE DRAWINGS

FIG. 21 is a diagram illustrating exemplary display on a terminal device of the refrigerator system according to Embodiment 1 of the present invention.

FIG. 22 is a flowchart illustrating an exemplary operation of the refrigerator system according to Embodiment 1 of the present invention.

DESCRIPTION OF EMBODIMENTS

Figure 1:
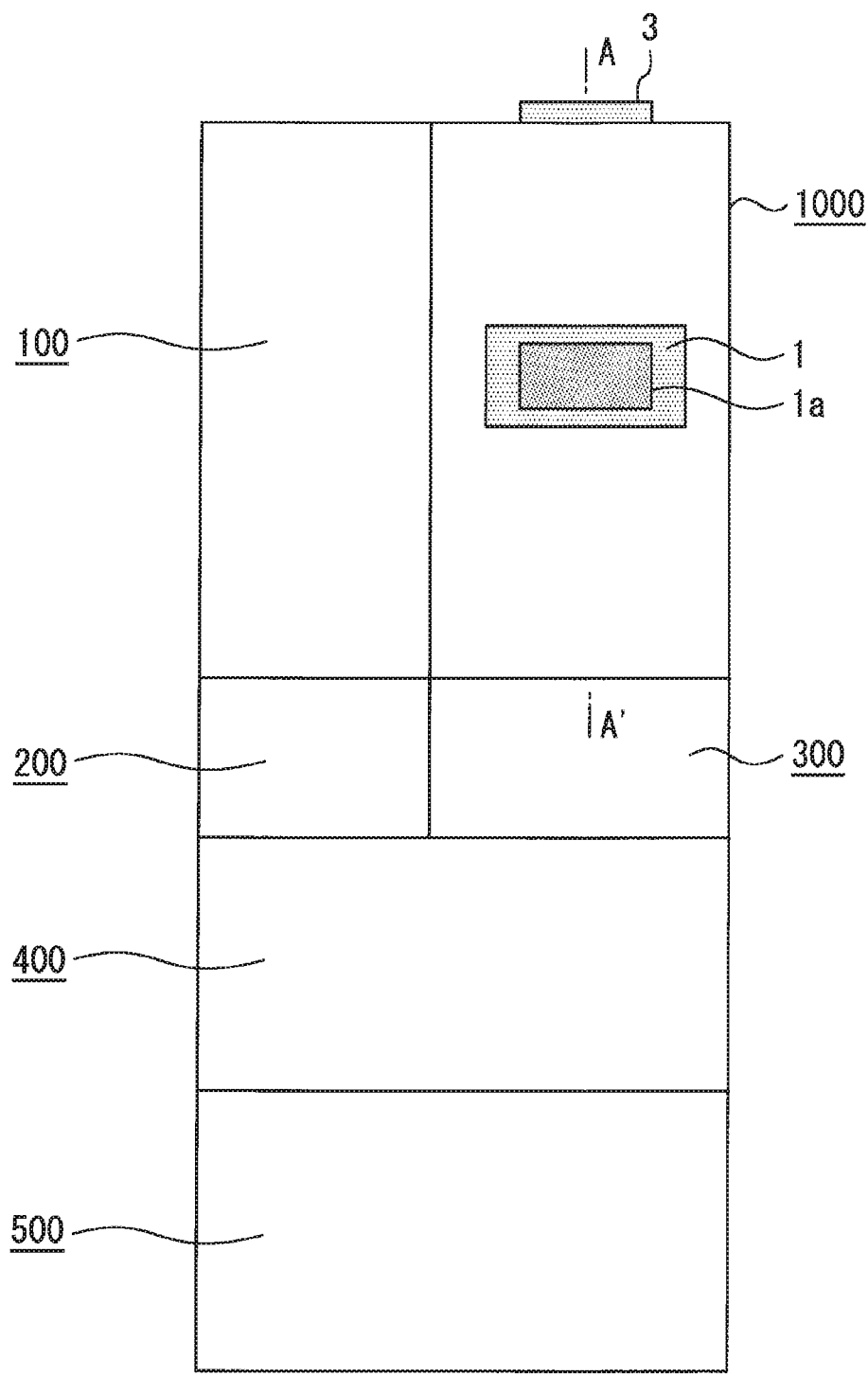
FIG. 1 is a front view of a refrigerator included in a refrigerator system according to Embodiment 1 of the present invention.

Some embodiments of the present invention are described with reference to accompanying drawings. In the drawings, the same or equivalent components are denoted by the same reference numerals, and repetitive description is appropriately simplified or omitted. Note that the present invention is not limited to the following embodiments, and can be variously modified without departing from the scope of the present invention.

Embodiment 1

Figure 2:
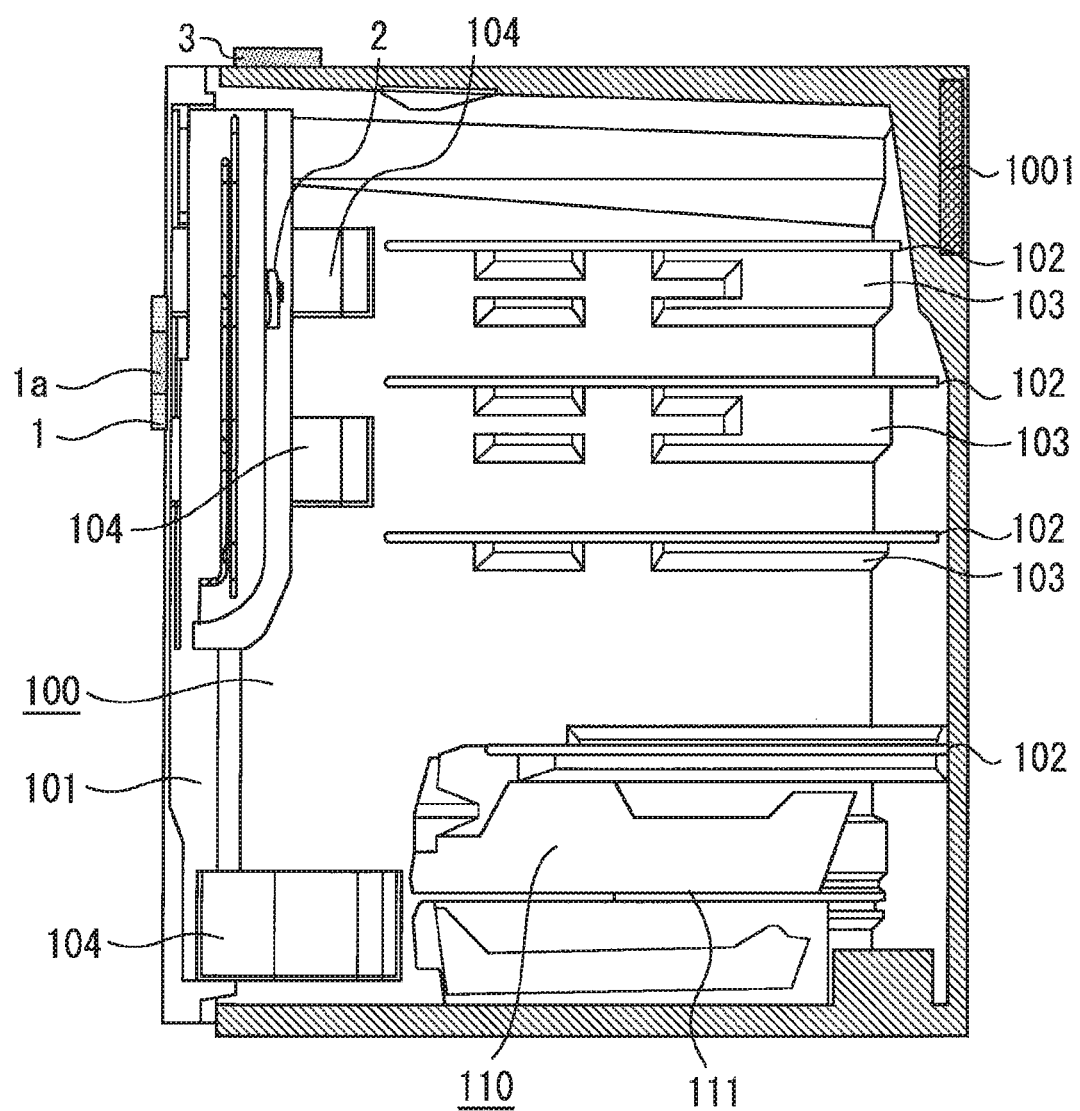
FIG. 2 is a cross-sectional view of the refrigerator according to Embodiment 1 of the present invention.
Figure 3:
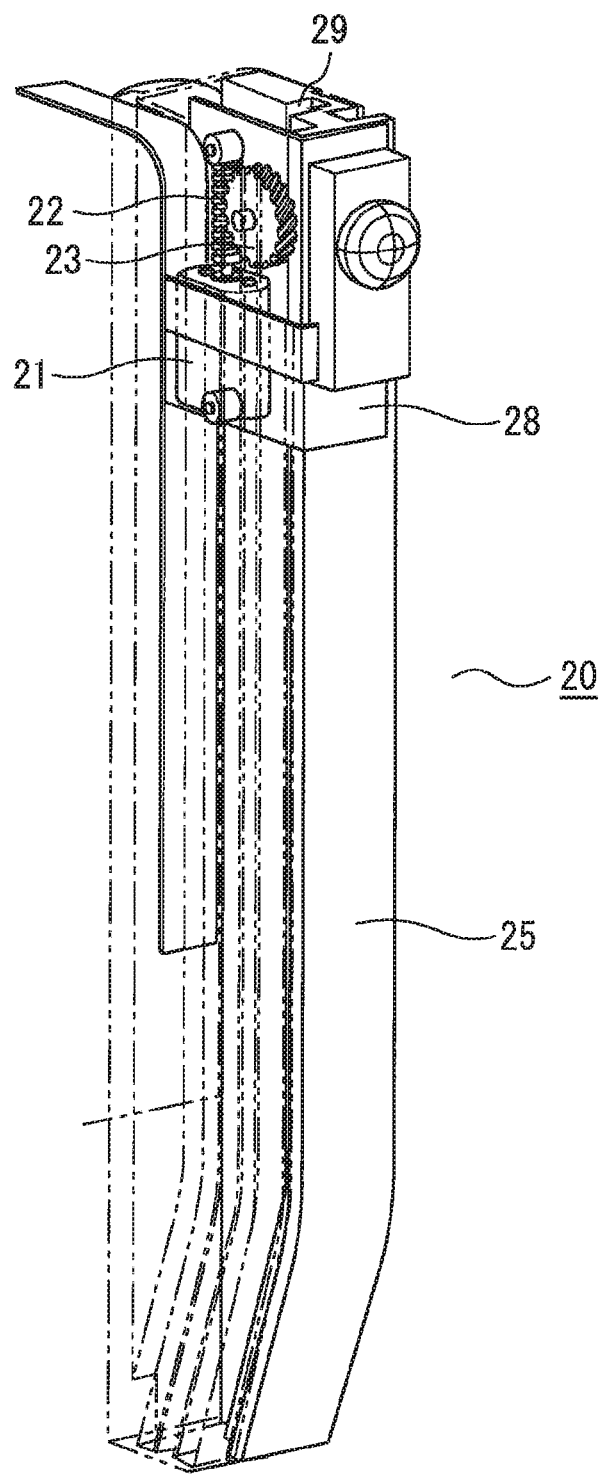
FIG. 3 is a perspective view of a camera moving device of the refrigerator according to Embodiment 1 of the present invention.
Figure 4:
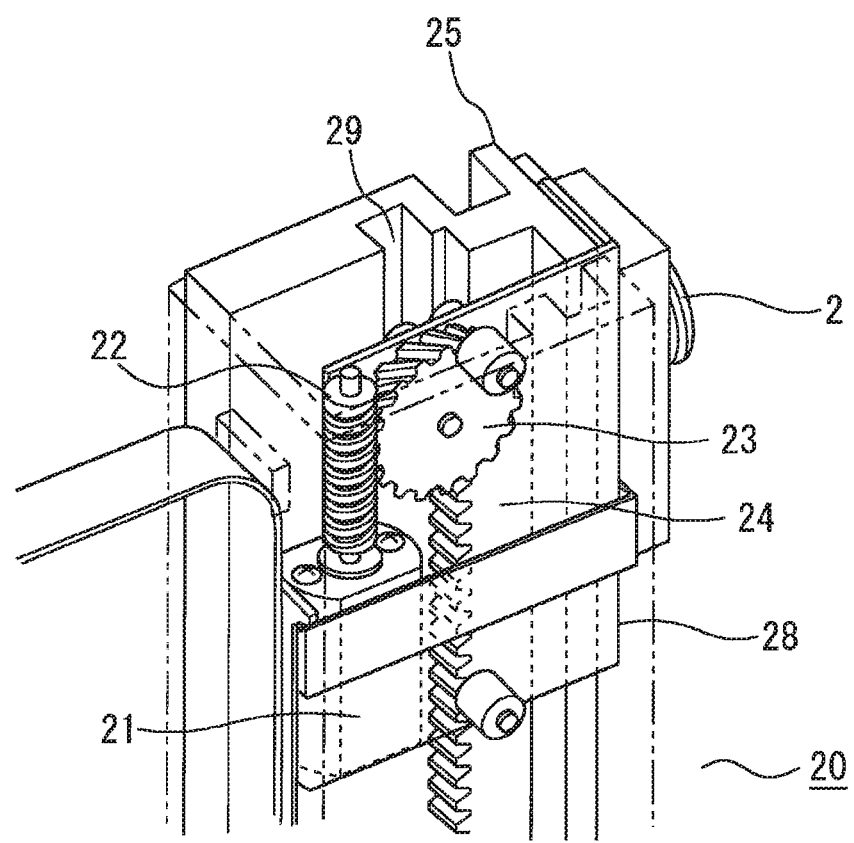
FIG. 4 is an enlarged perspective view transparently illustrating a main part of the camera moving device according to Embodiment 1 of the present invention.
Figure 5:
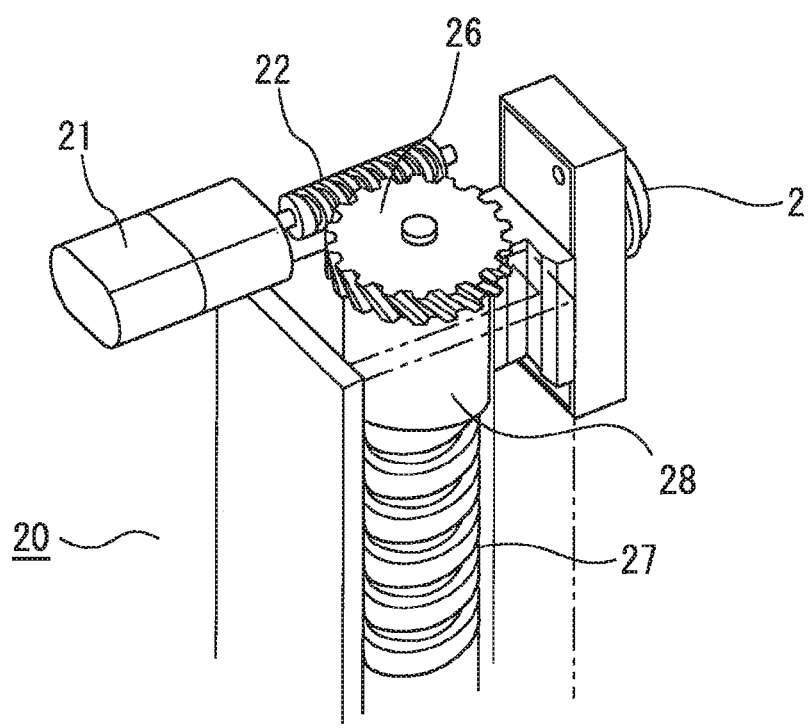
FIG. 5 is an enlarged perspective view transparently illustrating a main part of another example of the camera moving device according to Embodiment 1 of the present invention.
Figure 6:
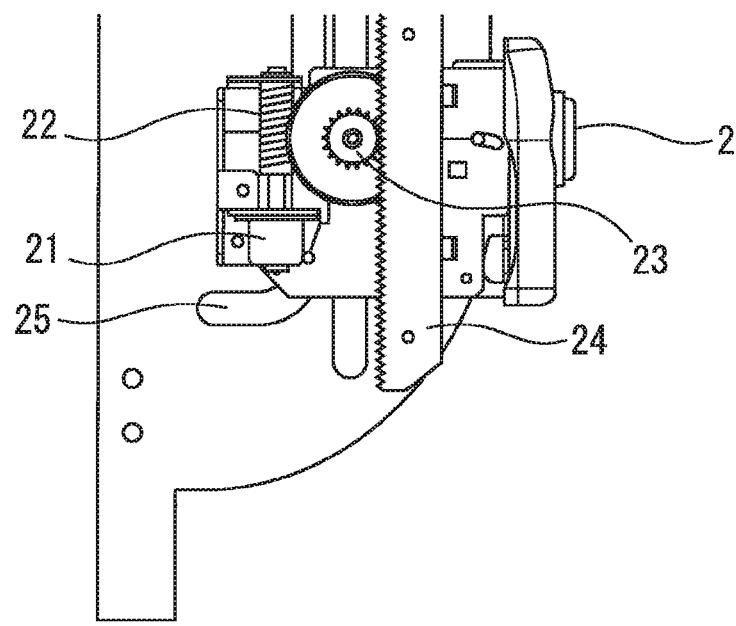
FIG. 6 is a diagram for description of motion at a lowermost part of the camera moving device according to Embodiment 1 of the present invention.
Figure 7:
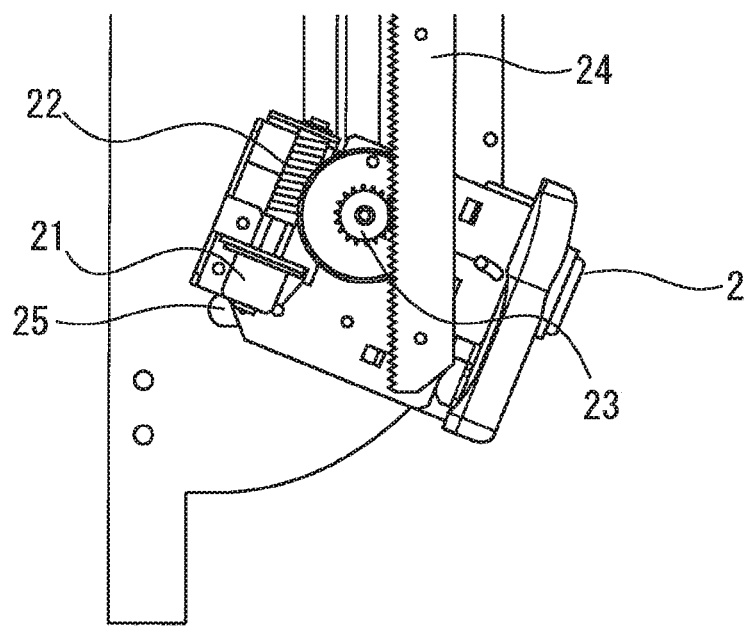
FIG. 7 is a diagram for description of motion at a lowermost part of the camera moving device according to Embodiment 1 of the present invention.
Figure 8:
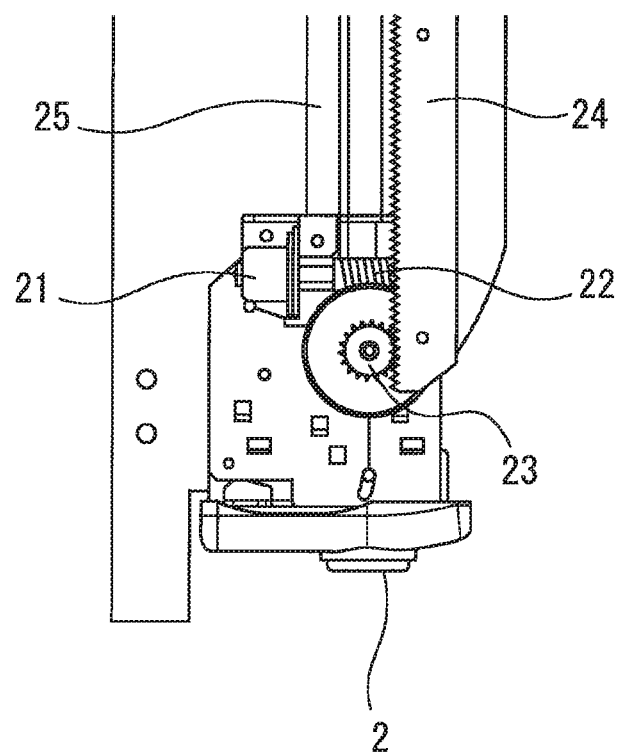
FIG. 8 is a diagram for description of motion at a lowermost part of the camera moving device according to Embodiment 1 of the present invention.
Figure 9:
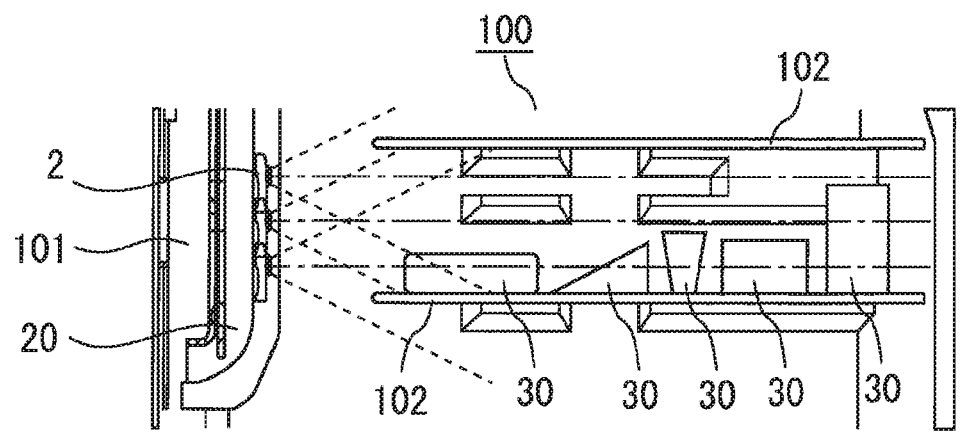
FIG. 9 is a main part cross-sectional view illustrating an exemplary image taking position of a camera of the refrigerator according to Embodiment 1 of the present invention.
Figure 13:
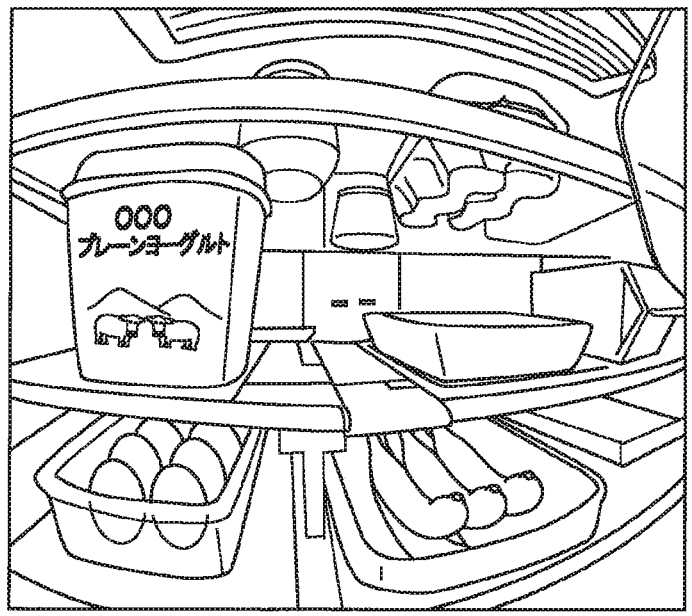
FIG. 13 is a diagram illustrating exemplary images of the inside of a storeroom, which are taken by the camera according to Embodiment 1 of the present invention.
Figure 14:
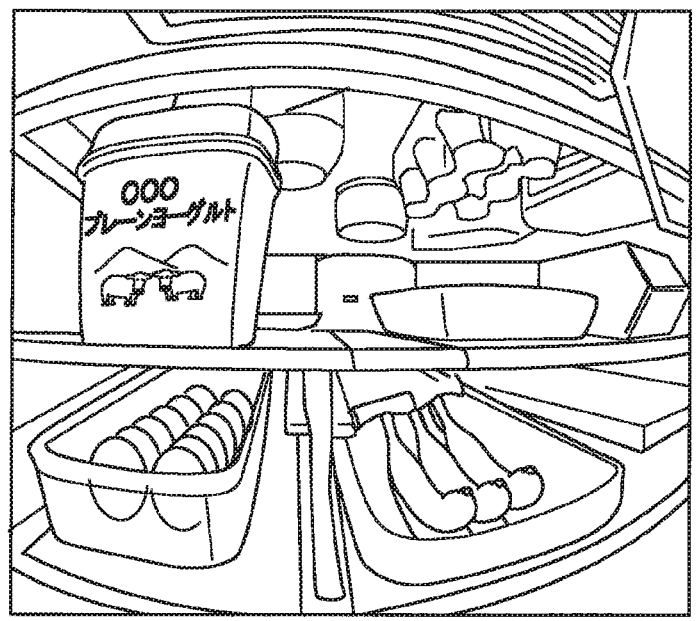
FIG. 14 is a diagram illustrating exemplary images of the inside of a storeroom, which are taken by the camera according to Embodiment 1 of the present invention.
Figure 15:
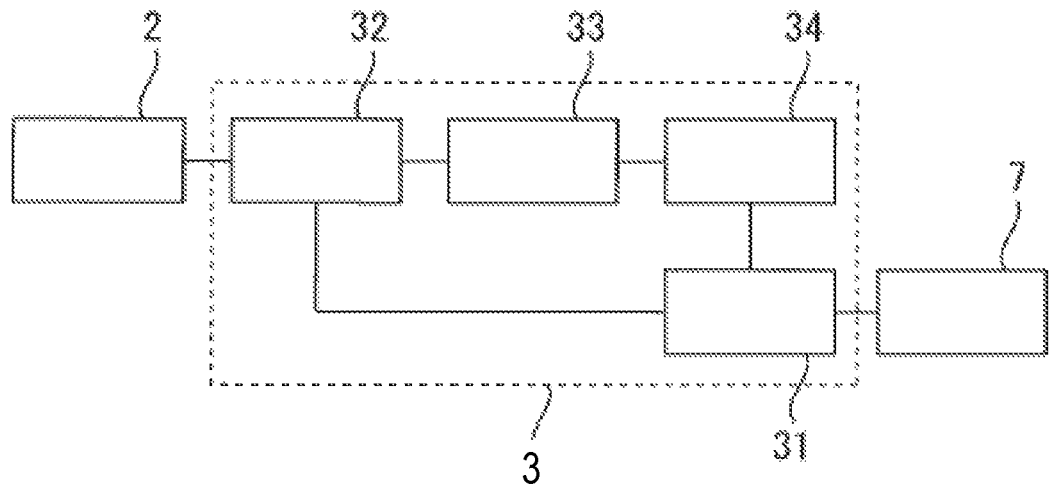
FIG. 15 is a block diagram illustrating the configuration of the refrigerator system according to Embodiment 1 of the present invention.
Figure 16:
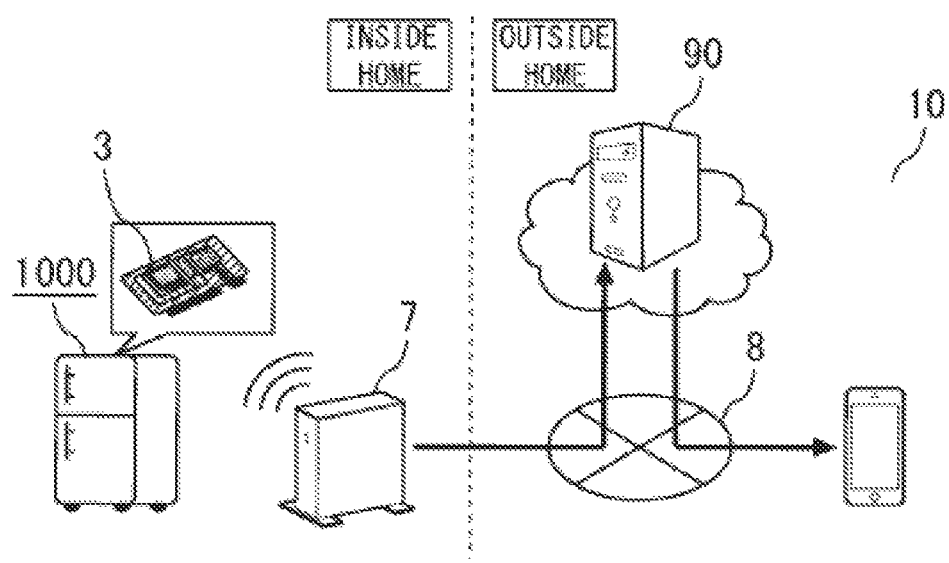
FIG. 16 is a diagram illustrating the entire configuration of the refrigerator system according to Embodiment 1 of the present invention.
Figure 17:
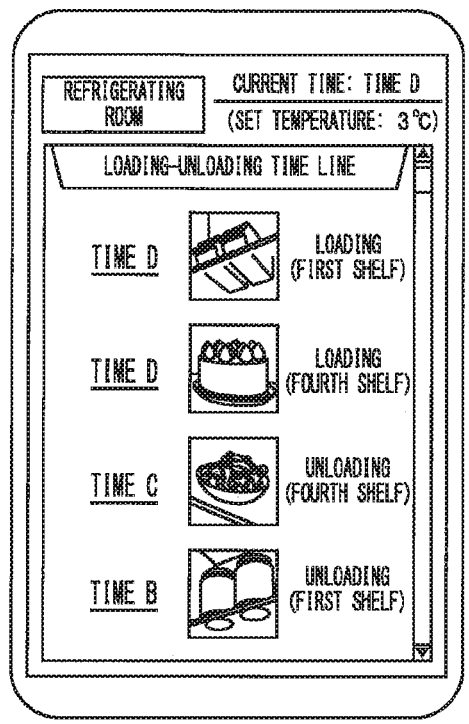
FIG. 17 is a diagram illustrating exemplary contents recorded in a food item image database of the refrigerator according to Embodiment 1 of the present invention.
Figure 23:
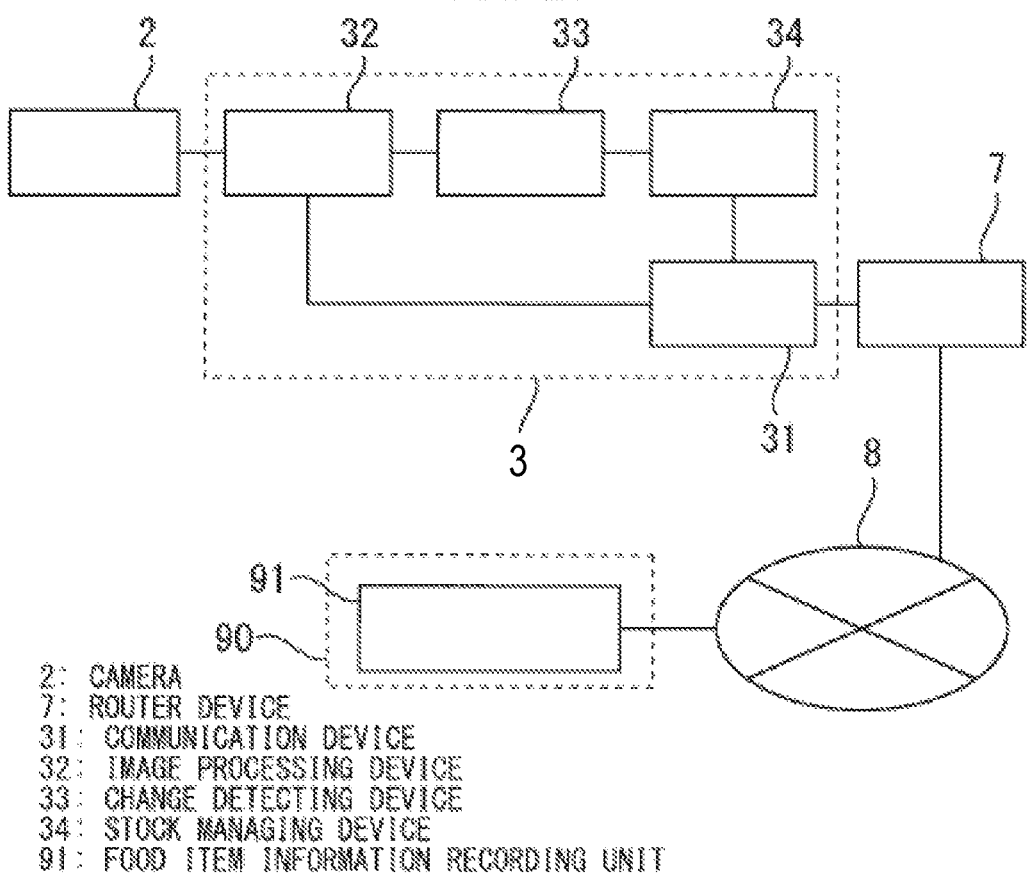
FIG. 23 is a block diagram illustrating another example of the configuration of the refrigerator system according to Embodiment 2 of the present invention.
Figure 24:
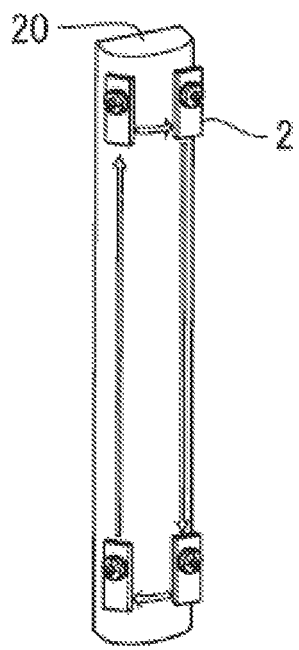
FIG. 24 is a perspective view illustrating another example of the camera moving device of the refrigerator according to Embodiment 2 of the present invention.

FIGS. 1 to 24 relate to Embodiment 1 of the present invention. FIG. 1 is a front view of a refrigerator included in a refrigerator system. FIG. 2 is a cross-sectional view of the refrigerator. FIG. 3 is a perspective view of a camera moving device of the refrigerator. FIG. 4 is an enlarged perspective view transparently illustrating a main part of the camera moving device. FIG. 5 is an enlarged perspective view transparently illustrating a main part of another example of the camera moving device. FIGS. 6 to 8 are diagrams for description of motion at a lowermost part of the camera moving device. FIG. 9 is a main part cross-sectional view illustrating an exemplary image taking position of a camera of the refrigerator. FIGS. 10 to 14 are diagrams illustrating exemplary images of the inside of a storeroom, which are taken by the camera. FIG. 15 is a block diagram illustrating the configuration of the refrigerator system. FIG. 16 is a diagram illustrating the entire configuration of the refrigerator system. FIG. 17 is a diagram illustrating exemplary contents recorded in a food item image database of the refrigerator. FIGS. 18 to 21 are diagrams illustrating exemplary display on a terminal device of the refrigerator system. FIG. 22 is a flowchart illustrating an exemplary operation of the refrigerator system. FIG. 23 is a block diagram illustrating another example of the configuration of the refrigerator system. FIG. 24 is a perspective view illustrating another example of the camera moving device of the refrigerator.

Note that, in the drawings, dimensional relationship, shapes, and the like of components may be different from those of actual components. Further, positional relationship (for example, vertical relationship) of the components in the specification is positional relationship in a case where a freezer refrigerator is installed in a usable state, in principle.

The refrigerator system according to Embodiment 1 of the present invention includes a refrigerator main body 1000 illustrated in FIG. 1. In Embodiment 1, the refrigerator main body 1000 includes a refrigerating room 100, an ice making room 200, a switching room 300, a freezing room 400, and a vegetable room 500. The refrigerating room 100, the ice making room 200, the switching room 300, the freezing room 400, and the vegetable room 500 are storerooms that store food items.

As illustrated in FIG. 1, these storerooms are disposed in the order of the refrigerating room 100, the ice making room 200 and the switching room 300, the freezing room 400, and the vegetable room 500 from above. The ice making room 200 and the switching room 300 are disposed side by side at the same vertical position. A refrigerating room door 101 that opens and closes the refrigerating room 100 is provided as a front surface of the refrigerating room 100. The refrigerating room door 101 is an exemplary door that opens and closes a side of the storeroom. Each of the ice making room 200, the switching room 300, the freezing room 400, and the vegetable room 500 can be drawn out toward a front side of the refrigerator main body 1000 together with a door provided as a front surface thereof.

An operation panel 1 is provided on a front surface of the refrigerating room door 101. The operation panel 1 includes a panel display unit 1a. The panel display unit 1a is a main body display unit that can displaying information. The panel display unit 1a can display internal information such as a set temperature and the current temperature of each storeroom. The panel display unit 1a includes, for example, a liquid crystal display. The operation panel 1 includes an operation unit such as a touch panel, a button, or a switch. A user can input necessary information by operating the operation unit of the operation panel 1. Note that the installation position of the operation panel 1 is not limited to the door of the refrigerating room 100, but the operation panel 1 may be provided on, for example, the door of any other storeroom or a side surface of the refrigerator main body 1000.

As illustrated in FIG. 2, a front surface side of the refrigerating room 100 (the left side of the drawing) is blocked by the refrigerating room door 101. Note that the cross-sectional view illustrated in FIG. 2 corresponds to a section taken along line A-A' in FIG. 1. At least one refrigerating-room shelf plate 102 is provided inside the refrigerating room 100. In this example, a plurality of refrigerating-room shelf plates 102 are provided. The inside of the refrigerating room 100 is divided into a plurality of spaces (shelves) in the vertical direction by the refrigerating-room shelf plates 102. Food items are placed on each refrigerating-room shelf plate 102. In this manner, at least one shelf on which food items are placed is provided in the refrigerating room 100 as a storeroom.

Each refrigerating-room shelf plate 102 is supported at a predetermined position in the refrigerating room 100 by a shelf-plate supporting unit 103. The shelf-plate supporting unit 103 is formed to protrude inside the refrigerating room 100 from the inner surface of a side wall of the refrigerating room 100. Note that the shelf-plate supporting unit 103 may be configured so that the vertical position of the refrigerating-room shelf plate 102 can be changed.

A space below the lowermost refrigerating-room shelf plate 102 is a chilled room 110. A chilled case 111 is installed inside the chilled room 110. The chilled case 111 can be drawn out toward the front side along a guide member (not illustrated) such as a rail. Door pockets 104 are provided on the inner surface of the refrigerating room door 101. Food items can be placed and stored also in the door pockets 104.

A camera 2 is installed on the inner surface of the refrigerating room door 101. The camera 2 takes an image of the inside of a storeroom (in this example, the refrigerating room 100) from the refrigerating room door 101 side, and outputs the image as a storeroom image. The refrigerator main body 1000 according to Embodiment 1 of the present invention includes a camera moving device 20. The camera moving device 20 moves the camera 2 in the vertical direction. The camera moving device 20 is provided on the inner surface of the refrigerating room door 101.

The camera moving device 20 moves the camera 2 in the vertical direction within a movable range. The movable range is set in advance. In this example, the upper end of the movable range is an upper end part of the inside of the refrigerating room 100. The lower end of the movable range is a position directly above the lowermost door pocket 104.

The following describes the configuration of the camera moving device 20 with reference to FIGS. 3 to 5. As illustrated in FIGS. 3 and 4, the camera moving device 20 includes a stepping motor 21, a worm gear 22, a pinion 23, a rack 24, a guide unit 25, and a camera supporting unit 28. The camera 2 is fixed to the camera supporting unit 28. The guide unit 25 is fixed to the refrigerating room door 101. The camera supporting unit 28 is movable relative to the guide unit 25. The guide unit 25 is disposed in the vertical direction at least across the above-described movable range. The guide unit 25 guides movement of the camera 2 and the camera supporting unit 28 across the above-described movable range.

As illustrated in FIG. 4, the stepping motor 21, the worm gear 22, and the pinion 23 are attached to the camera supporting unit 28. The rack 24 is attached to the guide unit 25. The rack 24 is disposed in the vertical direction across the above-described movable range. The guide unit 25 is provided with a groove 29. The groove 29 is disposed across the above-described movable range.

The stepping motor 21 drives movement of the camera 2. The worm gear 22 is fixed to a drive shaft of the stepping motor 21. The pinion 23 includes a large gear and a small gear that are integrated. The large and small gears of the pinion 23 are fixed to rotate about the same rotary shaft. The large gear of the pinion 23 is meshed with the worm gear 22. The small gear of the pinion 23 is meshed with the rack 24.

The pinion 23 rotates as the worm gear 22 is rotated by the stepping motor 21. As the pinion 23 being meshed with the rack 24 rotates, the rotary shaft of the pinion 23 linearly moves along the rack 24. The rotary shaft of the pinion 23 is rotatably supported by the camera supporting unit 28. Thus, through such a rack-pinion mechanism, the camera moving device 20 converts rotational motion of the stepping motor 21 into linear operation of the camera supporting unit 28 relative to the guide unit 25, thereby moving the camera 2 relative to the refrigerating room door 101 in the vertical direction.

Note that the moving amount of the camera 2 is proportional to the rotational amount of the stepping motor 21. The rotational amount of the stepping motor 21 can be controlled by using the number of steps. Accordingly, the camera moving device 20 can control the moving amount of the camera 2 by using the number of steps of the stepping motor 21.

FIG. 5 illustrates another example of the configuration of the camera moving device 20. In this example, the camera 2 is moved by a feed screw mechanism. In this example, the camera moving device 20 includes the stepping motor 21, the worm gear 22, a worm wheel 26, a feed screw 27, and the camera supporting unit 28.

The worm gear 22 is fixed to the drive shaft of the stepping motor 21. The worm wheel 26 is meshed with the worm gear 22. The feed screw 27 is coupled with the worm wheel 26 to rotate about the same rotary shaft. The feed screw 27 is disposed in the vertical direction across the above-described movable range. The camera supporting unit 28 is attached to the feed screw 27. The camera supporting unit 28 is provided with a female thread to be engaged with the thread of the feed screw 27. The camera 2 is fixed to the camera supporting unit 28.

The worm wheel 26 and the feed screw 27 rotate as the worm gear 22 is rotated by the stepping motor 21. As the feed screw 27 rotates, the camera supporting unit 28 linearly moves along the rotary shaft of the feed screw 27 by screw action. Through such a feed screw mechanism, the camera moving device 20 converts rotational motion of the stepping motor 21 into linear operation of the camera supporting unit 28, thereby moving the camera 2 relative to the refrigerating room door 101 in the vertical direction.

The following describes, with reference to FIGS. 6 to 8, the configuration of the camera moving device 20 at a lower end part of the above-described movable range and operation when the camera moving device 20 moves the camera 2 to the lower end of the above-described movable range. As described above, the groove 29 is formed at the guide unit 25 across the above-described movable range. As illustrated in these drawings, the groove 29 is smoothly curved from the vertical direction toward the refrigerating room door 101 side at the lower end part of the above-described movable range. The groove 29 extends in the vertical direction at the other part.

A protrusion (not illustrated) formed at the camera supporting unit 28 is inserted into the groove 29. The protrusion is disposed on the refrigerating room door 101 side of the pinion 23. As the pinion 23 rotates on the rack 24, the protrusion of the camera supporting unit 28 moves in the groove 29 while being regulated in the groove 29, which determines the orientation of the camera supporting unit 28, in other words, the orientation of the camera 2.

As illustrated in FIG. 6, at the part where the groove 29 extends in the vertical direction, the orientation of the camera 2 is maintained opposite to the refrigerating room door 101 even when the camera supporting unit 28 moves. When the camera 2 continues moving downward and the protrusion of the camera supporting unit 28 approaches the curve of the groove 29, the protrusion of the camera supporting unit 28 stops the downward movement and starts moving to the refrigerating room door 101 side while being guided by the groove 29 whereas the pinion 23 of the camera supporting unit 28 continues the downward movement. Accordingly, the camera supporting unit 28 starts inclining and the camera 2 starts pointing downward as illustrated in FIG. 7.

Then, when the camera 2 reaches the lower end of the above-described movable range, the camera 2 points directly below as illustrated in FIG. 8. As described above, the lower end of the movable range is directly above the door pocket 104. Thus, the camera 2 at the lower end of the movable range can take an image of the inside of the door pocket 104 from above. In this manner, the camera moving device 20 can move the camera 2 to a position and an orientation where the camera 2 can take an image of the inside of the door pocket 104 from above.

The camera 2 takes an image of the inside of the refrigerating room 100, for example, when the refrigerating room door 101 is opened and closed. This is because, when the refrigerating room door 101 is opened and closed, a food item may be loaded to or unloaded from the inside of the refrigerating room 100, and the storage state inside the refrigerating room 100 may be changed. The refrigerator main body 1000 includes a sensor capable of sensing opening and closing of the door. The sensor is, for example, a common magnet sensor. Specifically, for example, the sensor detects approach of a magnet embedded in the refrigerating room door 101 by using a pair of reed switches installed on the refrigerator main body 1000 side. The camera 2 takes an image while the inside of the refrigerating room 100 is illuminated, for example, after having sensed closing of the refrigerating room door 101 being opened.

This image taking of the inside of the refrigerating room 100 by the camera 2 is performed in cooperation with movement of the camera 2 by the camera moving device 20. The following describes image taking operation of the camera 2 and the camera moving device 20 in cooperation. To take an image of the inside of the refrigerating room 100, the camera moving device 20 moves the camera 2 from one end to the other end of the above-described movable range. During this movement, the camera 2 performs the image taking when passing through a particular position. Alternatively, while moving the camera 2 from one end to the other end of the above-described movable range, the camera moving device 20 may stop the camera 2 at a particular position and the camera 2 may perform the image taking during the stop.

For example, the camera moving device 20 moves the camera 2 downward from the upper end to the lower end of the above-described movable range. During this movement, the camera 2 takes images of each above-described shelf at a plurality of viewpoints as illustrated in, for example, FIG. 9. The plurality of viewpoints at which the camera 2 performs image taking are each classified into a first viewpoint or a second viewpoint. Basically, only one first viewpoint is set to each shelf. The second viewpoint is different from the first viewpoint. At least one second viewpoint is set to each shelf.

When having reached the lower end of the above-described movable range in this manner, the camera 2 is at the position and in the orientation where the camera 2 can take an image of the inside of the door pocket 104 from above as described above. Then, the camera 2 takes an image while stopping at this position. This image taken by the camera 2 illustrates the storage status of the lowermost door pocket 104.

As described above, the camera 2 performs image taking for each shelf inside the refrigerating room 100 at the first viewpoint and the at least one second viewpoint different from the first viewpoint. In addition, in Embodiment 1, the camera 2 takes an image of the inside of the door pocket 104 from above. Note that the camera moving device 20 may move the camera 2 upward from the lower end to the upper end of the above-described movable range.

Figure 10:
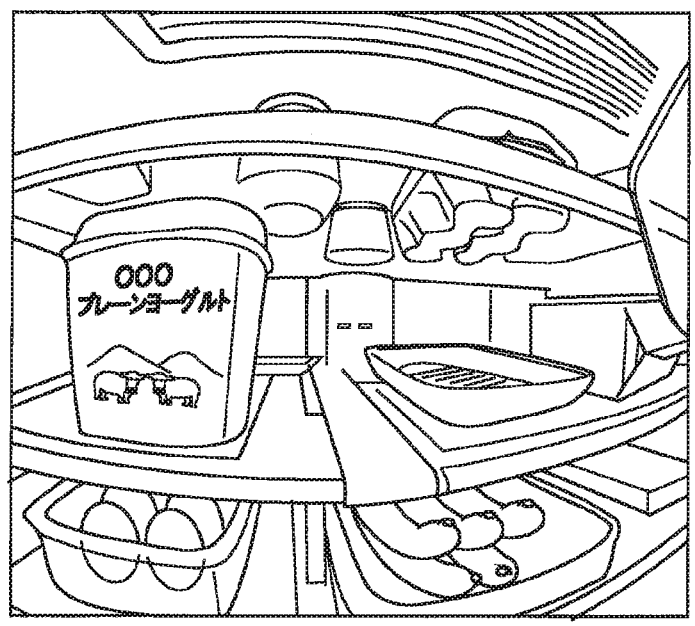
FIG. 10 is a diagram illustrating exemplary images of the inside of a storeroom, which are taken by the camera according to Embodiment 1 of the present invention.
Figure 11:
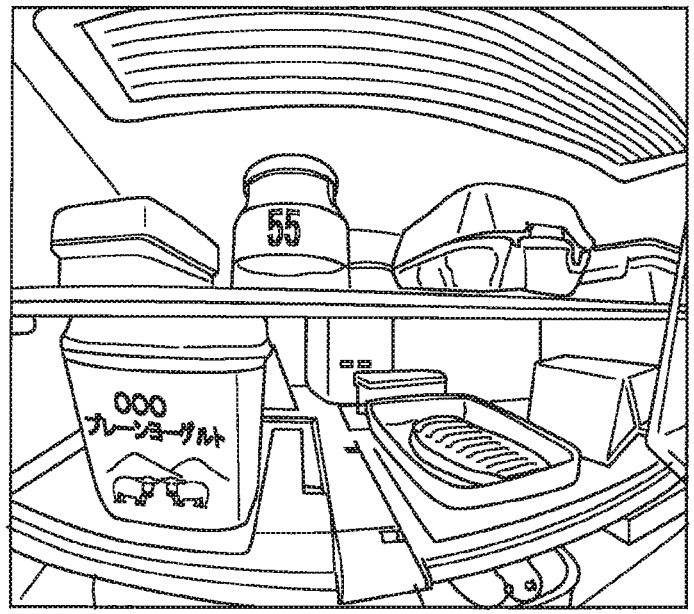
FIG. 11 is a diagram illustrating exemplary images of the inside of a storeroom, which are taken by the camera according to Embodiment 1 of the present invention.
Figure 12:
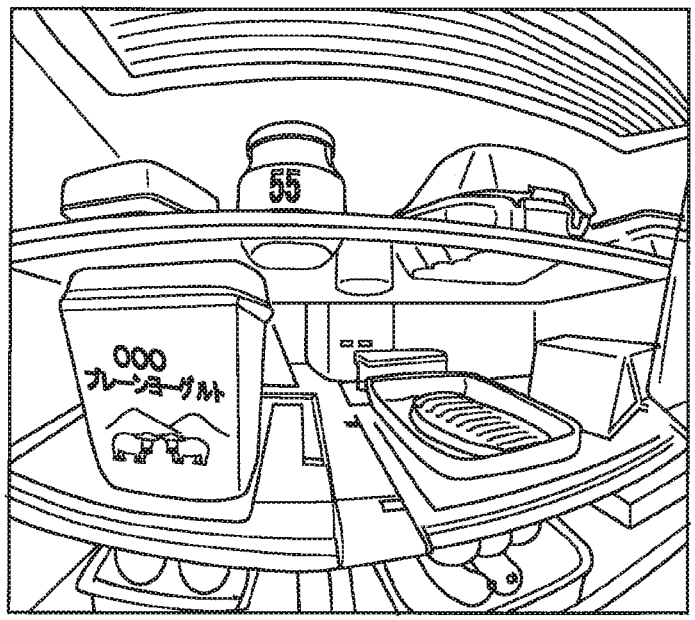
FIG. 12 is a diagram illustrating exemplary images of the inside of a storeroom, which are taken by the camera according to Embodiment 1 of the present invention.

FIG. 10 illustrates an exemplary image of a shelf inside the refrigerating room 100, which is taken by the camera 2 at the above-described first viewpoint. In this example, the first viewpoint is a viewpoint at which the shelf is viewed from the front side. FIGS. 11 to 14 illustrate exemplary images of the shelf inside the refrigerating room 100, which are taken by the camera 2 at the above-described second viewpoints. FIG. 11 illustrates an example in which the shelf is looked down at one of the second viewpoints. In this example, the second viewpoint is positioned higher than the front side of the shelf as the above-described first viewpoint. FIG. 12 illustrates an example in which the shelf is slightly looked down at one of the second viewpoints. In this example, the second viewpoint is positioned higher than the front side of the shelf as the above-described first viewpoint and lower than the looking-down viewpoint of FIG. 11. FIG. 14 illustrates an example in which the shelf is looked up at one of the second viewpoints. In this example, the second viewpoint is positioned lower than the front side of the shelf as the above-described first viewpoint. FIG. 13 illustrates an example in which the shelf is slightly looked up at one of the second viewpoints. In this example, the second viewpoint is positioned lower than the front side of the shelf as the above-described first viewpoint and higher than the looking-up viewpoint of FIG. 14.

In Embodiment 1, the camera moving device 20 controls the position of the camera 2 in the above-described movable range by using the number of steps of the stepping motor 21. Specifically, the camera moving device 20 specifies a position at which the camera 2 performs image taking by counting the number of steps of the stepping motor 21.

When the position of the refrigerating-room shelf plate 102 is fixed and cannot be changed, the above-described first and second viewpoints at which the camera 2 performs image taking may be fixed as well. Specifically, for example, the camera 2 records in advance information of positions at which the above-described first and second viewpoints are reached, for example, the number of steps of the stepping motor 21. Then, the camera 2 performs image taking when the number of steps of the stepping motor 21 becomes equal to the value recorded in advance.

When the position of the refrigerating-room shelf plate 102 can be changed, positions at which the camera 2 performs image taking may be determined by specifying the current position of the refrigerating-room shelf plate 102 as follows. In the first exemplary method, the shelf-plate supporting unit 103 is provided with means for detecting the position of the refrigerating-room shelf plate 102. Specifically, the means for detecting the position of the refrigerating-room shelf plate 102 is, for example, a micro switch. In this case, the micro switch is installed so that the micro switch is pressed by the refrigerating-room shelf plate 102 when the refrigerating-room shelf plate 102 is positioned at an appropriate position on the shelf-plate supporting unit 103. Accordingly, the position of the refrigerating-room shelf plate 102 can be detected based on which micro switch is pressed.

In the second exemplary method, the position of the refrigerating-room shelf plate 102 is specified by using an image taken by the camera 2. In this method, first, the camera 2 takes images while being moved across the entire above-described movable range by the camera moving device 20. Image taking positions in this case are not particularly limited as long as the entire range of the refrigerating room 100, which can be taken by the camera 2 is covered in the end. Then, the images taken in this manner are analyzed to specify the current position of the refrigerating-room shelf plate 102.

Note that, when the sensor configured to sense opening and closing of the refrigerating room door 101 has sensed a closing operation of the refrigerating room door 101, the camera moving device 20 may move the camera 2 to one end of the above-described movable range to perform zero-point correction of the stepping motor 21. Specifically, when the sensor has sensed a closing operation of the refrigerating room door 101, the camera moving device 20 first moves the camera 2 to, for example, the upper end of the above-described movable range. Then, the camera moving device 20 sets the count value of the number of steps of the stepping motor 21 to zero. In this manner, difference between the number of steps of the stepping motor 21 and the actual position of the camera 2 can be corrected.

The description is continued with reference to FIG. 2 again. The refrigerator main body 1000 includes a control substrate 1001. The control substrate 1001 is housed, for example, in an upper part of the refrigerator main body 1000 on the back surface side. The control substrate 1001 includes a control circuit or the like for performing various kinds of control necessary for operation of the refrigerator main body 1000. The control substrate 1001 includes, for example, a microcomputer, in other words, a processor and a memory. When the processor executes a computer program stored in the memory, the control substrate 1001 executes processing set in advance to control the refrigerator main body 1000.

The refrigerator system according to Embodiment 1 of the present invention includes at least the refrigerator main body 1000 configured as described above. The refrigerator system further includes an image server 3. The image server 3 performs storage, management, and external transmission of the storeroom image. The image server 3 is installed inside a home where the refrigerator main body 1000 is installed (hereinafter, simply referred to as "inside home") and outside the storeroom of the refrigerator main body 1000. FIGS. 1 and 2 illustrate an example in which the image server 3 is disposed on the outer surface of a ceiling part of the refrigerator main body 1000. Note that the installation position of the image server 3 is not limited to the ceiling part of the refrigerator main body 1000. The image server 3 may be installed on a side surface or the back surface of the refrigerator main body 1000 or the door of the storeroom as long as the installation position is outside the storeroom of the refrigerator main body 1000. The image server 3 may be mounted on the control substrate 1001.

Similarly to the above-described control substrate 1001, the image server 3 includes, for example, a microcomputer, in other words, a processor and a memory. In addition, as illustrated in FIG. 15, the image server 3 includes an image processing device 32, a change detecting device 33, a stock managing device 34, and a communication device 31. Functions of these components are achieved, for example, when the processor executes a computer program recorded in the memory in the microcomputer of the image server 3 and performs processing set in advance. Note that the image server 3 is connected with, for example, the control substrate 1001 and operates by receiving power supply from the control substrate 1001.

The image processing device 32 records the storeroom image output from the camera 2. As described above, when opening and closing of the refrigerating room door 101 are sensed, the camera 2 takes images of the storage status of each shelf plate and the lowermost door pocket 104 inside the refrigerating room 100 in cooperation with the camera moving device 20. The camera 2 outputs the taken images to the image processing device 32. The images output from the camera 2 are input to the image processing device 32.

Accordingly, the images output from the camera 2 are input to the image processing device 32 each time the refrigerating room door 101 is opened and closed (in other words, each time the storage state inside the refrigerating room 100 is potentially changed). In this manner, the images of the inside of the refrigerating room 100 in the latest state are constantly input to the image processing device 32.

The image processing device 32 temporarily records the input latest storeroom image. In this case, the image processing device 32 temporarily records, as image taking time information, a time at which the storeroom image is input to the image processing device 32, together with the storeroom image. Note that the image taking time information includes information of an image-taking date (day and month, or day, month, and year).

However, slight distortion due to characteristics of the lens of the camera 2 potentially occurs to the storeroom image recorded in the image processing device 32. In addition, brightness differs between images in some cases, depending on illumination and storage states inside the refrigerating room 100. Thus, the image processing device 32 may correct one or both of brightness and distortion of each image taken by the camera 2 as necessary before recording the image. In addition, the image processing device 32 may generate an entire image of the refrigerating room 100 by synthesizing images of the respective shelves after the correction.

In this manner, the image processing device 32 records, for each shelf of the inside of the refrigerating room 100, at least a latest image taken at the above-described first viewpoint and a latest image taken at the at least one above-described second viewpoint.

The change detecting device 33 acquires, from the image processing device 32, an image of each shelf, which is taken at the above-described first viewpoint and recorded in the image processing device 32. Then, the change detecting device 33 detects change in the food-item storage state of each shelf based on the image taken at the above-described first viewpoint. For example, the change detecting device 33 holds an image taken at the first viewpoint and previously acquired from the image processing device 32. Then, the previous image is compared with a currently acquired image for each shelf to detect change in the food-item storage state of the shelf. As for a shelf, change in the food-item storage state of which is detected by the change detecting device 33, an image of the shelf, which is taken at the above-described first viewpoint is transferred from the change detecting device 33 to the stock managing device 34.

The stock managing device 34 extracts an image of each food item from an image taken by the camera 2. Then, the stock managing device 34 records the extracted image of each food item in association with shelf specification information uniquely specifying a shelf on which the food item is placed. The shelf specification information is, for example, a number sequentially allocated to each shelf in the descending order of height.

For example, the stock managing device 34 first extracts images of each food item from images taken by the camera 2. Subsequently, the stock managing device 34 compares images of each food item extracted from images taken by the camera 2 at two continuous time points, thereby determining whether the food item is loaded in or unloaded from the refrigerating room 100. In this case, approximate loading or unloading date and time can be specified based on the image-taking dates and times of the two images used in the loading-unloading determination. In this manner, the stock managing device 34 specifies loading or unloading date and time for the images of each food item based on the images taken by the camera 2.

More specifically, the stock managing device 34 extracts an image of each food item from an image transferred from the change detecting device 33 to the stock managing device 34. Specifically, the stock managing device 34 extracts an image of each food item from an image taken at the above-described first viewpoint for a shelf, change in the food-item storage state of which is detected by the change detecting device 33. Then, the stock managing device 34 determines loading or unloading for the extracted image of each food item. When the shelf is loaded or unloaded, the stock managing device 34 specifies shelf specification information of the loaded or unloaded shelf.

The communication device 31 can perform communication with the outside. The communication device 31 performs mutual communication of information between the image server 3 of the refrigerator main body 1000 and a router device 7 by using, for example, a publicly known wireless communication technology. Note that the communication between the image server 3 and the router device 7 is not limited to a wireless scheme but may be performed by a wired scheme.

FIG. 16 illustrates the entire configuration of the refrigerator system according to Embodiment 1 of the present invention. As illustrated in the drawing, the refrigerator system according to Embodiment 1 of the present invention includes a terminal device 10. The terminal device 10 is provided to perform communication with the communication device 31. Specific examples of the terminal device 10 include a PC, a smartphone, and a tablet terminal. Note that the number of terminal devices 10 is one or more, preferably, two or more.

The terminal device 10 includes a terminal display unit (not illustrated). The terminal display unit includes, for example, a liquid crystal display. The terminal display unit may be configured by a touch panel to display information and receive an operation from the user. The terminal display unit of the terminal device 10 can display the storeroom images and various kinds of information including the image taking time information.

As illustrated in FIG. 16, the refrigerator main body 1000, the image server 3, and the router device 7 are installed inside the home. The router device 7 is connected with an external server 90 through, for example, the Internet 8 to perform communication therebetween. The drawing exemplarily illustrates a case in which a cloud server including a plurality of servers (server group) connected with the Internet 8 is used as the external server. However, the external server 90 is not limited to the cloud server but may be one server. The Internet 8 and the external server 90 are located outside the home where the refrigerator main body 1000 is installed (hereinafter, simply referred to as "outside home").

The communication device 31 transmits images and information recorded in the image processing device 32 and the stock managing device 34 to the external server 90 outside the home through the router device 7 and the Internet B. Then, the external server 90 records the received images and information. In particular, the communication device 31 transmits, to the external server 90, a taken image of a shelf, change in the food-item storage state of which is detected by the change detecting device 33. In this case, the communication device 31 transmits, to the outside, both an image taken at the above-described first viewpoint and an image taken at the above-described second viewpoint.

Note that the maximum number of retrial times for upload of the storeroom images from the communication device 31 to the external server 90 may be set based on an assumption that congestion occurs to communication with the external server 90 and the storeroom images cannot be uploaded (transmitted) at one time. Then, when the maximum number of retrial times is reached, the communication device 31 may immediately upload the storeroom images.

The terminal device 10 outside the home accesses the external server 90 through the Internet 8. When the user performs, on the terminal device 10, an operation to display images and information relating to the refrigerator main body 1000, the terminal device 10 transmits a transmission request. The external server 90 having received the transmission request transmits images and information recorded in the external server 90 to the terminal device 10. The terminal device 10 receives the images and information from the external server 90 through the Internet 8. Then, the terminal device 10 displays, on the terminal display unit, the received images and information relating to the refrigerator main body 1000. In this manner, the terminal device 10 can display the images transmitted to the outside by the communication device 31.

Note that the terminal device 10 may receive, through the router device 7 and the Internet 8 but not through the external server 90, the images and information relating to the refrigerator main body 1000 and transmitted from the communication device 31. In addition, when the stock managing device 34 determines that the refrigerating room 100 is loaded or unloaded, the communication device 31 may notify the terminal device 10 of the determination through the router device 7 and the Internet 8.

FIGS. 17 to 20 illustrate example screens displayed on the terminal device 10. FIG. 17 illustrates exemplary display of a "loading-unloading time line". As described above, the stock managing device 34 of the image server 3 records loading or unloading date and time, distinction between loading and unloading, an image of a loaded or unloaded food item, and the shelf specification information of a shelf onto or from which the food item is loaded or unloaded based on images of the inside of the refrigerating room 100, which is taken by the camera 2. The loading-unloading time line is a screen that displays the images and the information in time-series order.

Figure 18:
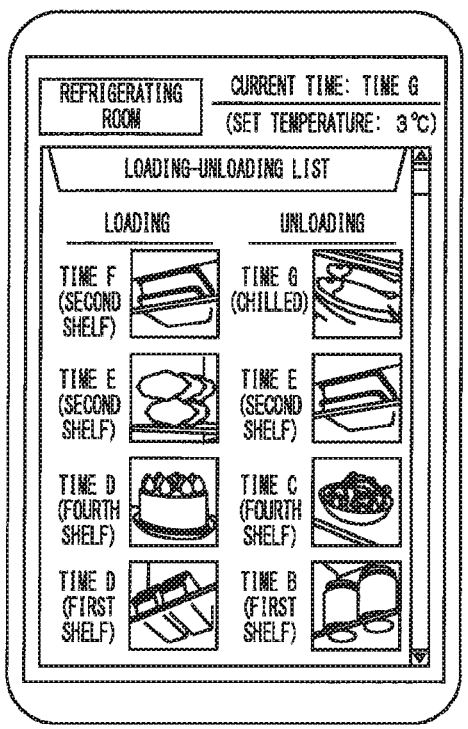
FIG. 18 is a diagram illustrating exemplary display on a terminal device of the refrigerator system according to Embodiment 1 of the present invention.

FIG. 18 illustrates exemplary display of a "loading-unloading list". Similarly to the loading-unloading time line, the loading-unloading list displays loading or unloading date and time, distinction between loading and unloading, an image of a loaded or unloaded food item, and the shelf specification information of a shelf onto or from which the food item is loaded or unloaded, which are recorded in the stock managing device 34 of the image server 3. However, display format is different between the loading-unloading list and the loading-unloading time line. The loading-unloading list is a screen that displays, in a list format, loading and unloading date and time, an image of a loaded or unloaded food item, and the shelf specification information of a shelf onto or from which the food item is loaded or unloaded, while food items are classified into a "loading" column and an "unloading" column.

Figure 19:
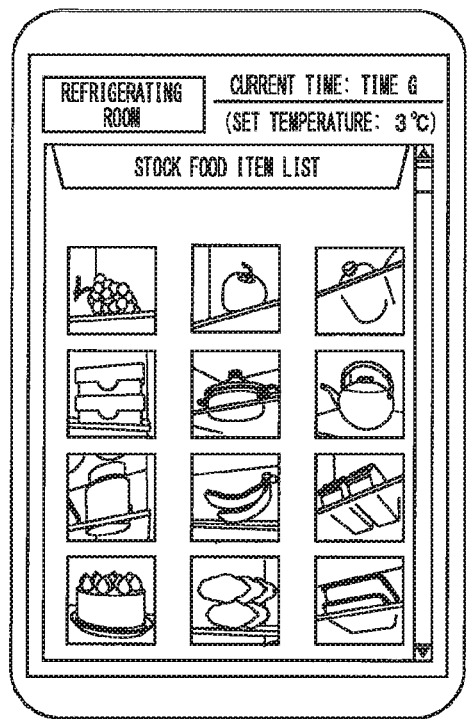
FIG. 19 is a diagram illustrating exemplary display on a terminal device of the refrigerator system according to Embodiment 1 of the present invention.

FIG. 19 illustrates exemplary display of a "stock food item list". As described above, the stock managing device 34 of the image server 3 extracts images of each food item from images of the inside of the refrigerating room 100, which are taken by the camera 2 and records the images. The stock food item list is a screen that displays, in a list format, images of each food item stored in the refrigerating room 100 at a certain time.

Figure 20:
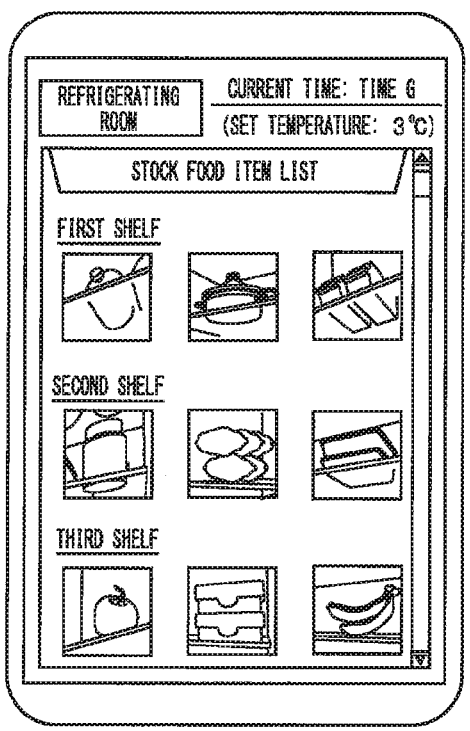
FIG. 20 is a diagram illustrating exemplary display on a terminal device of the refrigerator system according to Embodiment 1 of the present invention.

FIG. 20 illustrates another exemplary display of the "stock food item list". In the exemplary display, the stock food item list is a screen that displays images of each food item stored in the refrigerating room 100 at a certain time in a list format in a divided manner for each shelf.

As described above, when food item images are displayed together with the shelf specification information and displayed in a divided manner for each shelf, the user can easily find a desired food item.

Note that the terminal device 10 may preferentially display images of a shelf, change in the food-item storage state of which is detected by the change detecting device 33. Specifically, for example, in the screen of the "stock food item list" illustrated in FIG. 20, images of a shelf, change in the food-item storage state of which is detected may be displayed at the highest position.

Moreover, the terminal device 10 may directly display an image taken at the above-described first viewpoint and an image taken at the at least one above-described second viewpoint. In this case, which of the image taken at the first viewpoint and the image taken at the at least one second viewpoint is to be displayed is preferably changeable. Specifically, for example, when the user performs a swipe operation on the touch panel while an image at a certain viewpoint is displayed, the viewpoint of a displayed image may be changed in accordance with the direction and amount of the swipe operation.

The above-described screens of the "loading-unloading time line", the "loading-unloading list", and the "stock food item list" may be displayed also on the panel display unit 1a of the operation panel 1. In addition to these screens, the panel display unit 1a may display various kinds of images and information managed by and recorded in the stock managing device 34, images recorded in the image processing device 32, and the like.

The stock managing device 34 may not only extract images of each food item inside the refrigerating room 100 from images taken by the camera 2 but also determine the kind and amount of each food item inside the refrigerating room 100 from images taken by the camera 2. For the determination, the stock managing device 34 records a food item image database in advance. The food item image database is a set of data in which each kind of food item is associated with at least one of shape, size, color, and exterior label of the food item. For this, the stock managing device 34 includes a food item information recording unit configured to record each kind of food item in association with at least one of shape, size, color, and exterior label of the food item in advance.

The following describes a specific example of the information recorded in the food item image database with reference to FIG. 21. The food item image database records, for each kind of food item, a characteristic attribute that allows distinction of the kind of food item from the other kinds of food item. In this example, a characteristic amount of a food item belonging to the kind of food item or a characteristic amount of a container containing the food item is recorded in association with the kind of food item. Specifically, the characteristic amount of each kind of food item is information such as a shape (outline), the size of a long axis, a representative color (RGB value), and a label (characters).

Note that the shape of each kind of food item recorded in the food item image database may be, for example, a geometric shape (for example, column or trapezoid) closest to the outer shape of the food item in addition to the outline described as an example. In this case, in the determination by the stock managing device 34, collation with the shape recorded in the food item image database is performed by a method such as pattern matching. As for the color, another index value such as luminance or saturation may be used in addition to the RGB value of the representative color.

The stock managing device 34 determines the kind and amount of each food item in the storeroom (in this example, the refrigerating room 100) based on images recorded in and managed by the stock managing device 34 while referring to information recorded in the food item image database as described above. In this determination, the stock managing device 34 performs collation by determining matching with the characteristic amount of which kind of food item among kinds of food item recorded in the food item image database for images of each food item extracted from images taken by the camera 2.

When the characteristic amount matched with an image of an individual food item is recorded in the food item image database, the stock managing device 34 determines that the kind of the food item of the image is associated with the matched characteristic amount in the food item image database. Note that, when no data matched with the characteristic amount is recorded in the food item image database, the kind of the food item of the image may be substituted by a most similar kind of food item, or the food item of the image may be identified only in size as a stored item of an unknown kind.

In this manner, the stock managing device 34 can specify the kind and amount of each food item stored in the refrigerating room 100 by comparing images of the food item extracted from images taken by the camera 2 with characteristic amounts recorded in the food item image database.

The following describes, with reference to FIG. 22, an exemplary process of image taking of the inside of the refrigerating room 100 by the camera 2 and processing at the image server 3 in the refrigerator system configured as described above. First, at step S11, the control circuit of the control substrate 1001 for the camera 2 and the camera moving device 20 checks whether closing of the refrigerating room door 101 being opened is sensed. When opening and closing of the refrigerating room door 101 are not sensed, the processing at step S11 is repeated until opening and closing of the refrigerating room door 101 are sensed. When opening and closing of the refrigerating room door 101 are sensed, the process proceeds to step S12.

At step S12, the camera moving device 20 moves the camera 2. Then, the camera 2 takes an image of each shelf inside the refrigerating room 100 at the above-described first viewpoint. After step S12, the process proceeds to step S13. At step S13, an image of each shelf at the first viewpoint, image taking of which is performed at step S12 is compared with an image at the previous image taking. Subsequently at step S14, the change detecting device 33 checks whether the image of each shelf taken at step S12 and the image at the previous image taking have difference therebetween. When these images have no difference therebetween, the process returns to step S11.

When the image of each shelf taken at step S12 and the image at the previous image taking have difference therebetween at step S14, the process proceeds to step S15. At step S15, the camera moving device 20 moves the camera 2 again and the camera 2 takes, at the above-described second viewpoint, an image of a shelf for which it is determined that the image taken at step S12 and the image at the previous image taking have difference therebetween. After step S15, the process proceeds to step S16.

At step S16, for the shelf for which it is determined that the image taken at step S12 and the image at the previous image taking have difference therebetween, images of each food item are extracted from the image taken at the above-described first viewpoint and the image taken at the above-described second viewpoint. Then, the stock managing device 34 collates the extracted images of each food item with a food item information database to specify the kind of the food item.

Note that, in the above description, the stock managing device 34 extracts images of each food item from the image taken at the first viewpoint. However, images of each food item may be extracted not only from the image taken at the first viewpoint but also from the image taken at the second viewpoint. The accuracy of specifying the kind of each food item can be improved by using images at a plurality of viewpoints. After step S16, the process proceeds to step S17.

At step S17, distinction among loading, unloading, and movement is determined for the food item, the kind of which is specified at step S16. Note that the movement is movement of the food item between different shelves. In other words, the movement corresponds to determination that a food item determined to be unloaded from a shelf is loaded onto another shelf right after. When the processing at step S17 is completed, the process returns to step S11.

As illustrated as another example in FIG. 23, a food item information recording unit 91 as the above-described food item image database may be provided to the external server 90, not to the image server 3 (the stock managing device 34). The stock managing device 34 may determine the kind and amount of each food item inside the refrigerating room 100 from the image taken at the above-described first viewpoint with reference to information of the food item image database stored in the food item information recording unit 91 of the external server 90. With this configuration, the food item image database can be updated as needed by accessing the external server 90.

In addition, as illustrated in FIG. 24, the camera moving device 20 may be capable of moving the camera 2 in the horizontal direction as well. In an example illustrated in the drawing, the camera moving device 20 is movable in the horizontal direction at the upper and lower ends of the above-described movable range. In addition, the camera moving device 20 can move the camera 2 in the vertical direction at different positions in the horizontal direction. In this case, the camera moving device 20 may be capable of changing the orientation of the camera 2 in the horizontal direction.

Specifically, for example, the camera 2 takes images of the right half of the inside and right door pockets while moving up and takes images of the left half of the inside and left door pockets while moving down, thereby taking an entire image of the inside of the refrigerating room 100 including door pockets through vertical reciprocation. In this configuration, when having taken the entire image of the inside of the refrigerating room 100, the camera 2 returns to an image taking start place. In this manner, the entire image of the inside of the refrigerating room 100 including door pockets can be taken without using a wide-angle lens, which improves image resolution and reduces image distortion, thereby improving the accuracy of image recognition of each food item.

Note that the camera 2 and the camera moving device 20 may be detachable from the refrigerating room door 101. In addition, communication between each of the camera 2 and the camera moving device 20, and the control substrate 1001 or the like is preferably performed by a wireless or non-contact scheme. In this manner, maintainability of the lens of the camera 2 and the camera moving device 20 can be improved.

The refrigerator system configured as described above takes, at the first viewpoint, an image used to detect change in the storage state of each shelf inside the storeroom. The first viewpoint is suitable for detection of change in the storage state from an image. Specifically, for example, the first viewpoint is the front side of each shelf but is not limited thereto. Then, the camera 2 takes, at the second viewpoint different from the first viewpoint, an image of a shelf, change in the storage state of which is detected from the image taken at the first viewpoint. Then, the communication device 31 transmits the images taken at both the first and second viewpoints for the shelf, change in the storage state of which is detected, to, for example, the external server 90 or the terminal device 10 outside the refrigerator main body 1000.

Thus, decrease of the accuracy of detecting change in the food-item storage state inside the storeroom can be prevented by reducing the number of times of image taking by the camera 2 and using the first viewpoint suitable for detection of change in the storage state from an image. Then, images of the inside of the storeroom, which are taken at a plurality of viewpoints can be checked on the terminal device 10 by transmitting the images taken at both the first and second viewpoints only for a shelf, change in the storage state of which is detected. Accordingly, it is possible to reduce a communication load when images of the inside of the storeroom, which are taken at a plurality of viewpoints are transmitted to the outside of the refrigerator.

Embodiment 2

Figure 25:
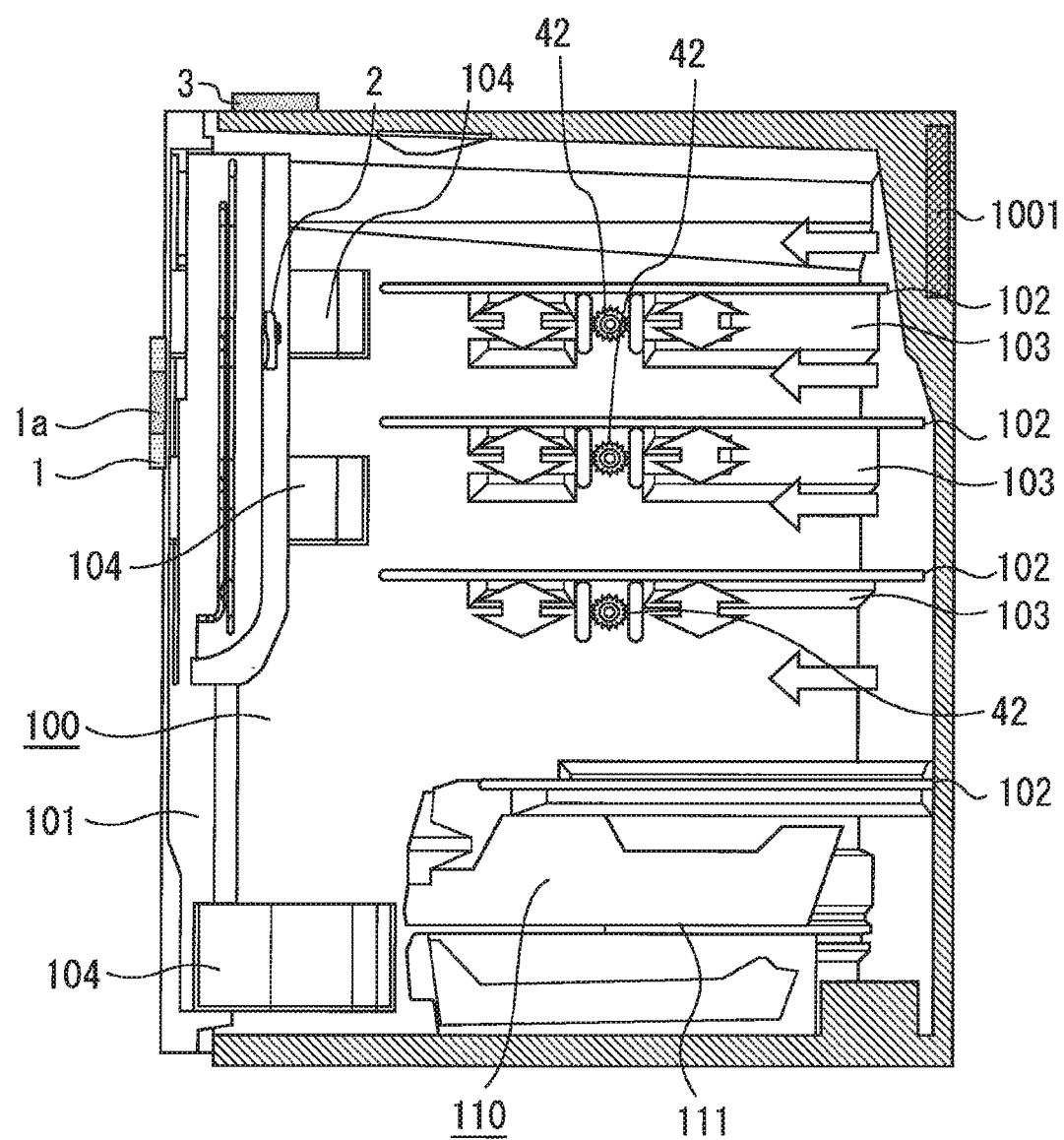
FIG. 25 is a cross-sectional view of the refrigerator.
Figure 26:
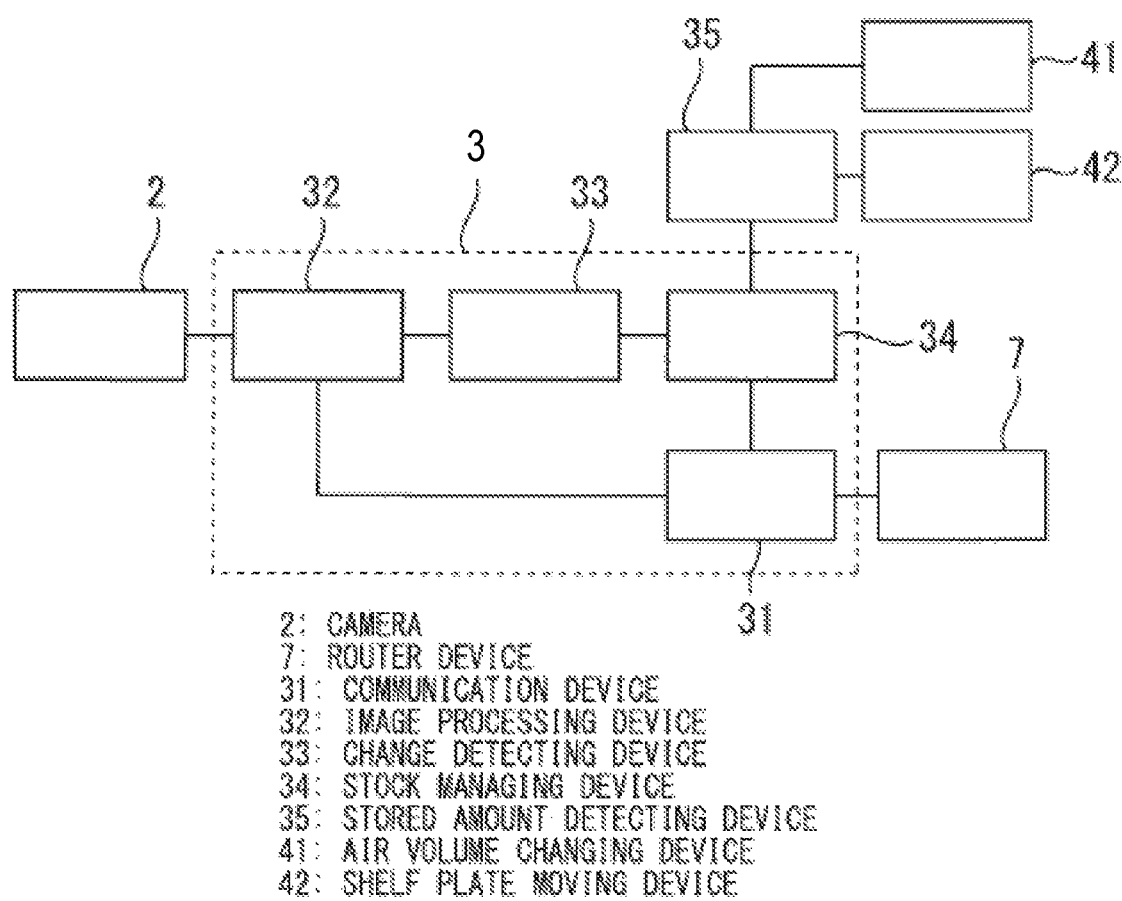
FIG. 26 is a block diagram illustrating the configuration of the refrigerator system.

FIGS. 25 and 26 relate to Embodiment 2 of the present invention. FIG. 25 is a cross-sectional view of the refrigerator, corresponding to FIG. 2 in Embodiment 1. FIG. 26 is a block diagram illustrating the configuration of the refrigerator system.

The following describes the refrigerator system according to Embodiment 2, mainly focusing on difference from Embodiment 1. Any configuration, description of which is omitted is basically same as that in Embodiment 1.

As illustrated in FIGS. 25 and 26, the refrigerator system according to the present embodiment includes a stored amount detecting device 35, an air volume changing device 41, and a shelf plate moving device 42. The stored amount detecting device 35 detects the stored amount of food items and the maximum height of food items for each shelf based on the shelf specification information and images of food items recorded in the stock managing device 34. The maximum height of food items is the maximum height among the heights of food items each stored on one shelf.

For example, the stored amount detecting device 35 detects the positions, sizes, number, and the like of food items from food item images recorded in the stock managing device 34. Then, the stored amount of food items and the maximum height of food items for each shelf are calculated from these pieces of information. In this case, the maximum height of food items and the like can be more accurately detected by using images taken at a plurality of viewpoints such as the above-described first and second viewpoints as well.

A cooling air outlet (not illustrated) is formed at the back surface of the inside of the refrigerating room 100. The outlet is disposed for each shelf so that cooling air is supplied to the shelf. The air volume changing device 41 is, for example, a damper provided to the outlet corresponding to each shelf. The air volume of cooling air supplied to each shelf can be individually adjusted by changing the opening degree of the damper of the air volume changing device 41.

The air volume changing device 41 changes the air volume of cooling air supplied to each shelf in accordance with the stored amount of food items on the shelf, which is detected by the stored amount detecting device 35. In this manner, air volume balance appropriate for the stored amount of each shelf can be achieved. Accordingly, the cooling efficiency of the refrigerating room 100 as a whole can be improved to reduce the amount of consumption energy.

The shelf plate moving device 42 moves, in the vertical direction, each refrigerating-room shelf plate 102 serving as a shelf inside the refrigerating room 100. Specifically, the shelf plate moving device 42 vertically moves the refrigerating-room shelf plate 102 through, for example, a rack-pinion mechanism.

The shelf plate moving device 42 changes the position of each shelf in the vertical direction in accordance with the stored amount of food items and the maximum height of food items on the shelf, which are detected by the stored amount detecting device 35. Specifically, for example, the shelf plate moving device 42 adjusts the shelf interval and the like in accordance with the stored amount of food items on each shelf so that a larger space is provided for a shelf having a larger stored amount. In this case, the shelf plate moving device 42 simultaneously moves the positions of a plurality of refrigerating-room shelf plates 102 as necessary so that the height of the space for each shelf is not lower than the maximum height of food items on the shelf. In this manner, a space in accordance with the stored amount of each shelf can be provided, and thus the cooling efficiency can be improved. In this case, the shape and the like of each food item can be three-dimensionally determined based on food item images taken at a plurality of viewpoints, thereby reliably avoiding contact between the refrigerating-room shelf plate 102 and any food item.

The refrigerator system configured as described above can achieve effects same as those in Embodiment 1. In addition, by utilizing images of the inside of the storeroom taken at the above-described first and second viewpoints to detect the stored amount of each shelf, the stored amount of each shelf can be more accurately detected.

Note that the camera 2 may be an infrared camera to acquire a thermal image. The acquired thermal image can be used to calculate a cooling load for food items stored on each shelf. Then, in accordance with the cooling load for each shelf, the refrigerating-room shelf plate 102 is moved by the shelf plate moving device 42, and the air volume of each shelf is changed by the air volume changing device 41, thereby further efficiently cooling food items inside the refrigerating room 100.

INDUSTRIAL APPLICABILITY

The present invention is applicable to a refrigerator system that includes a camera configured to take an image of the inside of a storeroom and transmits the image of the inside of the storeroom to the outside of a refrigerator.

REFERENCE SIGNS LIST

1 Operation panel
1*a* Panel display unit
2 Camera
3 Image server
7 Router device
8 Internet
10 Terminal device
20 Camera moving device
21 Stepping motor
22 Worm gear
23 Pinion
24 Rack
25 Guide unit
26 Worm wheel
27 Feed screw
28 Camera supporting unit
29 Groove
30 Food item
31 Communication device
32 Image processing device
33 Change detecting device
34 Stock managing device
35 Stored amount detecting device
41 Air volume changing device
42 Shelf plate moving device
90 External server
91 Food item information recording unit
100 Refrigerating room
101 Refrigerating room door
102 Refrigerating-room shelf plate
103 Shelf-plate supporting unit
104 Door pocket
110 Chilled room
111 Chilled case
200 Ice making room
300 Switching room
400 Freezing room
500 Vegetable room
1000 Refrigerator main body
1001 Control substrate

The invention claimed is:

1. A refrigerator comprising:
a main body having a storeroom for storing a food item;
one or more shelfs provided in a storeroom, each shelf configured to be put a food item on;
a door configured to open and close a side of the storeroom;
a camera arranged on an inner surface of the door, the camera configured to take an image of an inside of the storeroom;
a camera moving device configured to move the camera at least in a vertical direction;
a communication device configured to send an image taken by the camera to outside of the main body, and
a change detecting device configured to detect, based on the image taken by the camera, a change of food stored state for each shelf,
the camera configured to take the image for each shelf from a first viewpoint,
the change detecting device configured to detect, based on the image taken from the first viewpoint, the change of food stored state for each shelf,
the camera is configured to further take the image from one or more second viewpoints in addition to the first viewpoint for the shelf in which the change detecting device has detected the change of food stored state, each second viewpoint being different from the first viewpoint,
the communication device configured to send out images taken from both of the first viewpoint and the one or more second viewpoints for the shelf in which the change detecting device detects the change of food stored state.

2. A refrigerator system comprising:

the refrigerator according to claim 1, and a terminal device configured to display the image sent to outside of the main body by the communication device, wherein the terminal device is capable of changing which of the image taken at the first viewpoint and the image taken at the one or more second viewpoints is to be displayed.

3. The refrigerator system according to claim 2, wherein the terminal device preferentially displays an image of the shelf, change in the food-item storage state of which is detected by the change detecting device.

4. The refrigerator system according to claim 2, further comprising an image processing device configured to correct, for each shelf, one or both of brightness and distortion of each image taken by the camera and then synthesize the images to generate an entire image of the storeroom.

5. The refrigerator system according to claim 2, further comprising a stock managing device configured to extract an image of each food item from the images taken by the camera and record the extracted image of the food item in association with shelf specification information uniquely specifying the shelf on which the food item is placed.

6. The refrigerator system according to claim 5, wherein, for the shelf, change in the food-item storage state of which is detected by the change detecting device, the stock managing device extracts an image of each food item from the image taken at the first viewpoint and determines loading or unloading for the extracted image of the food item.

7. The refrigerator system according to claim 6, wherein the stock managing device records a kind of the food item in association with at least one of shape, size, color, and exterior label of the food item in advance and refers to the recorded information to determine the kind and an amount of each food item in the storeroom based on the image taken at the first viewpoint.

8. The refrigerator system according to claim 6, further comprising an external server provided to perform communication with the communication device, wherein the external server records a kind of the food item in association with at least one of shape, size, color, and exterior label of the food item in advance, and the stock managing device refers to the information recorded in the external server to determine the kind and an amount of each food item in the storeroom based on the image taken at the first viewpoint.

9. The refrigerator system according to claim 5, wherein, when the stock managing device determines loading or unloading of the storeroom, the communication device notifies the terminal device of the determination.

10. The refrigerator system according to claim 5, wherein the terminal device is capable of displaying the image of the food item loaded or unloaded, distinction between loading and unloading, and the shelf specification information in time-series order.

11. The refrigerator system according to claim 5, wherein the terminal device is capable of displaying the image of the food item loaded or unloaded, distinction between loading and unloading, and the shelf specification information in a divided manner for loading and unloading.

12. The refrigerator system according to claim 5, wherein the terminal device is capable of displaying the image of the food item stored in a divided manner for each shelf.

13. The refrigerator system according to claim 5, further comprising a stored amount detecting device configured to detect, for each shelf, a stored amount of each food item and a maximum height of the food item based on the shelf specification information and the image of each food item recorded in the stock managing device.

14. The refrigerator system according to claim 13, further comprising a shelf plate moving device configured to change a position of each shelf in the vertical direction in accordance with the stored amount of the food item and the maximum height of the food item for the shelf.

15. The refrigerator system according to claim 13, further comprising an air volume changing device configured to change an air volume of cooling air supplied to each shelf in accordance with the stored amount of the food item for the shelf.

16. The refrigerator system according to claim 2, wherein the camera moving device is capable of moving the camera in a horizontal direction as well.

* * * * *